(12) United States Patent
Matsubara et al.

(10) Patent No.: US 6,980,094 B2
(45) Date of Patent: Dec. 27, 2005

(54) DOOR CONTROL SYSTEM AND RECEIVER

(75) Inventors: Manabu Matsubara, Kobe (JP); Minoru Yoshimura, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 186 days.

(21) Appl. No.: 10/384,192

(22) Filed: Mar. 7, 2003

(65) Prior Publication Data

US 2004/0041693 A1     Mar. 4, 2004

(30) Foreign Application Priority Data

Mar. 11, 2002 (JP) .............................. 2002-065753

(51) Int. Cl.$^7$ ............................................. B60R 25/00
(52) U.S. Cl. ......................... 340/426.28; 340/426.13; 340/5.72; 70/5.72
(58) Field of Search ............... 340/426.28, 426.13, 340/426.49, 5.25, 10.1, 825.72, 825.69, 426.17, 340/426.29, 5.31, 5.72; 49/360; 70/14, 237, 70/271, 266, 267

(56) References Cited

U.S. PATENT DOCUMENTS

| | | | | |
|---|---|---|---|---|
| 5,952,937 A | * | 9/1999 | Koopman et al. | 340/825.72 |
| 6,178,699 B1 | * | 1/2001 | Kawanobe et al. | 49/360 |
| 6,243,022 B1 | * | 6/2001 | Furukawa | 340/825.72 |

FOREIGN PATENT DOCUMENTS

| | | |
|---|---|---|
| JP | 6-55936 | 3/1994 |
| JP | 8-4387 | 1/1996 |
| JP | 9-132983 | 5/1997 |
| JP | 10-184128 | 7/1998 |
| JP | 10-211819 | 8/1998 |
| JP | 11-293984 | 10/1999 |

OTHER PUBLICATIONS

Patent Abstract of Japan, Publication No. 06055936 A, Published on Mar. 1, 1994, in the Name of Tesuka Shigeki.
Patent Abstract of Japan, Publication No. 08004397 A, Published on Jan. 9, 1996, in the Name of Kojima Hiroaki, et al.
Patent Abstract of Japan, Publication No. 09132983 A, Published on May 20, 1997, in the Name of Suzuki Toshio, et al.
Patent Abstract of Japan, Publication No. 10184128 A, Published on Jul. 14, 1998, in the Name of Kikuchi Taizo, et al.
Patent Abstract of Japan, Publication No. 10211819 A, Published on Aug. 11, 1998, in the Name of Matsui Kaoru, et al.
Patent Abstract of Japan, Publication No. 11293984 A, Published on Oct. 26, 1999, in the Name of Kimura Toshihiro.

* cited by examiner

*Primary Examiner*—Davetta W. Goins
(74) *Attorney, Agent, or Firm*—Christie, Parker and Hale, LLP

(57) ABSTRACT

A system for remotely controlling the doors of an automotive vehicle with a reduced number of transmitters to be held and a reduced number of buttons of the transmitters is disclosed. The transmitter has a lock button and an unlock button. Upon depression of the lock button or the unlock button, a corresponding demand signal is transmitted repeatedly. The demand signal includes an ID code, a button code and a time code. The button code indicates the identification of the lock button or the unlock button. The time code indicates whether a button has been kept depressed for at least a predetermined length of time or the number of times the button is depressed. The receiver controls the door lock/unlock operation and the door open/close operation based on the button code and the time code. The time code can be replaced with a number-of-times code indicating the number of times a button is depressed.

23 Claims, 29 Drawing Sheets

Fig.20

| ID CODE | BUTTON CODE | TIME CODE | NUMBER-OF-TIMES CODE |
|---|---|---|---|
| 48 BITS | 2 BITS | 1 BIT | 2 BITS |

BUTTON CODE (2 BITS):
- SECOND BIT — 1: LOCK BUTTON ON, 0: LOCK BUTTON OFF
- LEAST SIGNIFICANT BIT — 1: UNLOCK BUTTON ON, 0: UNLOCK BUTTON OFF

TIME CODE (1 BIT): TURNED TO "1" WHEN LOCK OR UNLOCK BUTTON IS OPERATED FOR 2 secs OR LONGER NUMBER-OF-TIMES CODE (2 BITS): INDICATES THE NUMBER OF TIMES SHIFT BUTTON IS OPERATED BEFORE LOCK OR UNLOCK BUTTON OPERATION. "00" REPRESENTS NORMAL, "01" ONCE AND "10" TWICE

DOOR CONTROL SYSTEM AND RECEIVER

CROSS-REFERENCE TO RELATED APPLICATION

This application claims priority of Japanese Patent Application Number 2002-065753, filed Mar. 11, 2002.

1. Field of the Invention

The present invention relates to a system for remotely controlling the doors of an automotive vehicle, such as a door lock/unlock control operation and a door open/close control operation, and a receiver used for the door control system.

2. Description of the Related Art

A system capable of controlling the open/close operation of the vehicle doors remotely and from outside of the vehicle is described, for example, in Japanese Unexamined Patent Publication Nos. 6-55936 and 9-132983. The systems described in these publications comprise a portable transmitter including a door-open switch and a door-close switch so that the opening/closing of the doors are controlled by or during the operation of the switches.

A keyless entry apparatus is another remote control means for controlling the locking/unlocking of the vehicle doors. With regard to a vehicle equipped with the functions of both the door open/close operation and the door lock/unlock operation, therefore, the user is inconveniently required to have two types of different transmitters.

To overcome this disadvantage, Japanese Unexamined Patent Publications Nos. 10-184128 and 10-211819 describe a system in which a single transmitter is capable of performing the dual remote control functions for controlling the open/close operation and the lock/unlock operation of the doors.

The system described in these patent publications, however, is so constructed that a single transmitter includes a lock switch, an unlock switch, a door open switch and a door close switch. This leads to the disadvantages that many component parts are required and the transmitter becomes bulky and has an increased cost.

SUMMARY OF THE INVENTION

The object of the present invention is to provide a remote door control system in which the transmitters are reduced in both number and size, and a receiver used with the system.

The present invention has been developed to achieve the aforementioned object. The door control system according to the invention comprises a transmitter having a button operated to process a door lock demand and a button operated to process a door unlock demand, door open/close detection means for detecting whether the vehicle doors are open or closed, door open/close drive means for driving the vehicle doors to open or close, lock/unlock control means for controlling the lock/unlock operation of the vehicle doors, and a receiver.

The user operates the transmitter by manipulating the lock button and the unlock button in a first or a second mode. As a result, a lock demand signal in a first or a second mode, as the case may be, is transmitted from the transmitter.

The receiver, upon receipt of a demand signal in first mode from the transmitter, causes the lock/unlock control means to lock or unlock the doors, and upon receipt of a demand signal in second mode, causes the door open/close drive means to perform the operation of opening or closing the doors in accordance with whether the doors are closed or open, respectively, as detected by the door open/close detection means.

The demand signals are divided into first and second modes, for example, by the length of time or the number of times the lock/unlock button is operated.

According to this invention, the door lock/unlock control operation and the door open/close operation can be accomplished by changing the method of operating the buttons of the transmitter, and therefore the transmitter can be configured with a smaller number of buttons.

BRIEF DESCRIPTION OF THE DRAWINGS

The above object and features of the present invention will be more apparent from the following description of the preferred embodiment with reference to the accompanying drawings, wherein:

FIG. 20 shows a structure of a demand signal transmitted by the transmitter shown in FIG. 19;

DESCRIPTION OF THE PREFERRED EMBODIMENTS

Each of embodiments of the invention will be explained with reference to the drawings.

(First Embodiment)

Figure 1:
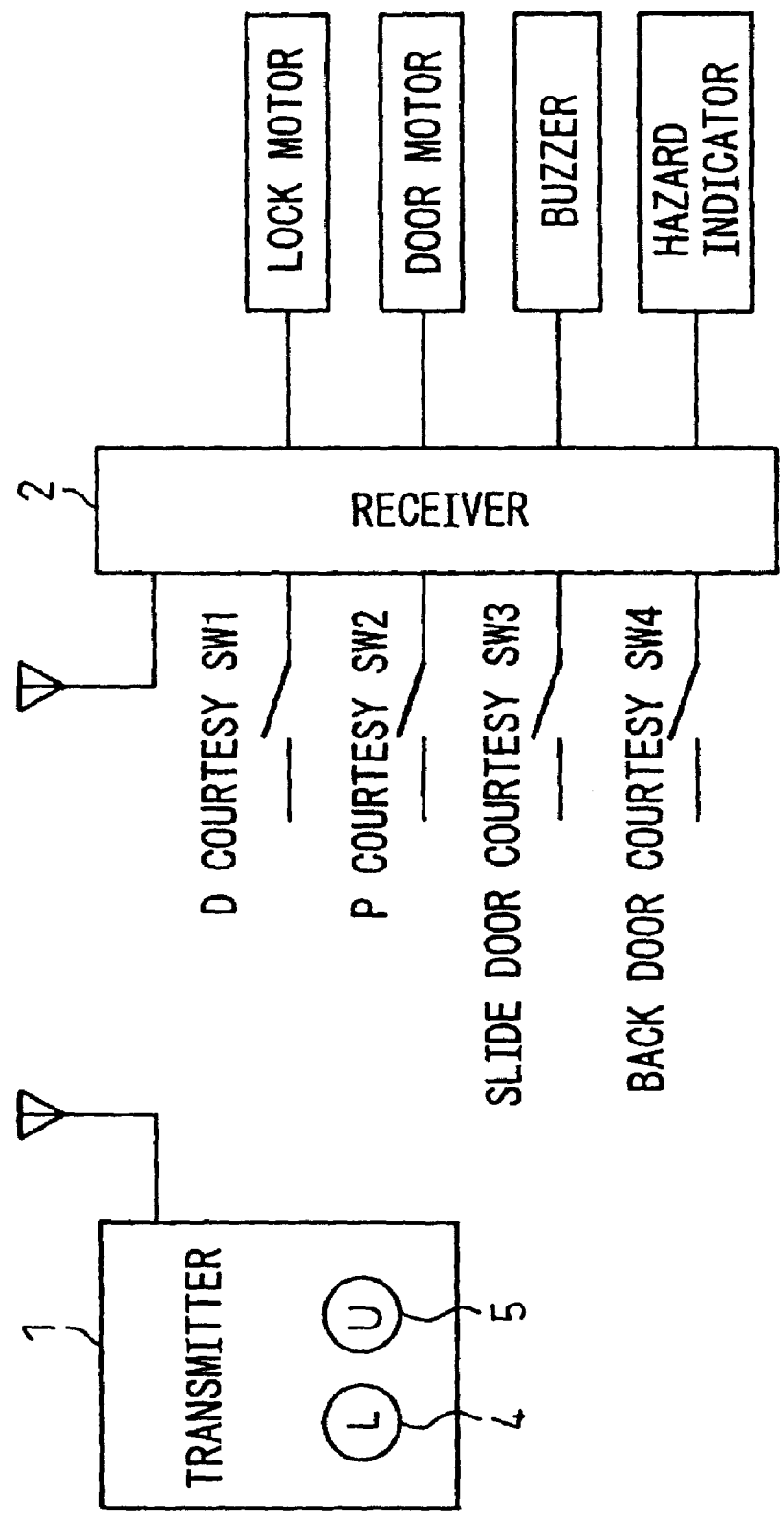
FIG. 1 shows a configuration of a door control system according to a first embodiment of the invention.

FIG. 1 shows a configuration of a door control system according to a first embodiment of the invention. This door control system comprises a transmitter 1 for transmitting a demand signal and a receiver 2 for controlling the lock/unlock operation and the open/close operation of the vehicle doors.

The transmitter 1 is portable and adapted to be taken out of the vehicle 3. The transmitter 1 includes a lock button 4, an unlock button 5 and, though not shown, a microcomputer, a memory and a transmission circuit.

In this embodiment, the operator attempting to lock or unlock the doors depresses the lock button 4 or the unlock button 5, as the case may be, for a short length of time (less than two seconds). For closing or opening the door, on the other hand, the lock button 4 or the unlock button 5, as the case may be, is depressed for not less than two seconds. The transmitter 1 outputs a demand signal corresponding to each of the aforementioned manners in which the button 4 or 5 is depressed.

Figure 2:
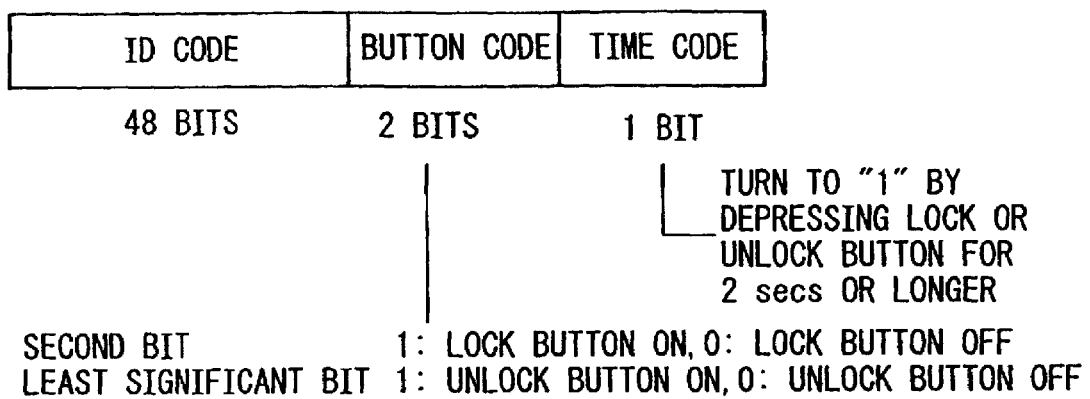
FIG. 2 shows a structure of a demand signal transmitted by the transmitter shown in FIG. 1.
Figure 3:
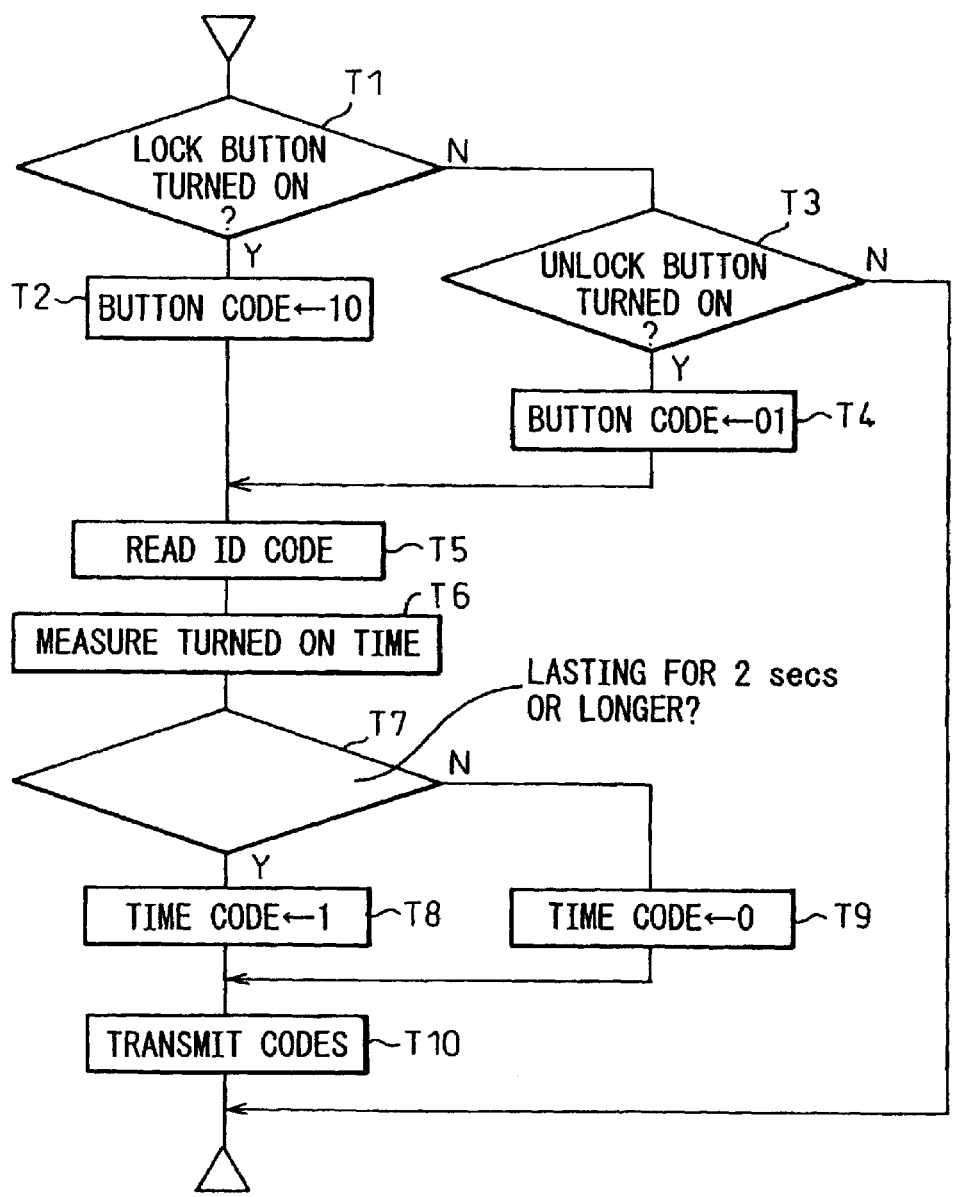
FIG. 3 is a flowchart showing the operation of the transmitter shown in FIG. 1.

FIG. 2 shows a structure of the demand signal transmitted by the transmitter 1. FIG. 3 shows the process executed by the microcomputer of the transmitter 1.

The demand signal is composed of an ID code of 48 bits, a button code of two bits and a time code of one bit.

The ID code is a unique one for identifying the transmitter 1.

In the button code, the second bit represents the turning on/off of the lock button 4, and takes the form of 1 for turning on and 0 for turning off. The least significant bit represents the on/off state of the unlock button 5, and takes the form of 1 for turning on and 0 for turning off.

The time code represents the time during which the button 4 or 5 is depressed, and takes the form of 1 when it is depressed for not less than 2 seconds, and the form of 0 when it is depressed for less than 2 seconds. In this embodiment, the button code and the time code show the manner in which the buttons 4 and 5 are operated.

With reference to FIG. 3, an explanation will be given of the process for producing and transmitting a demand signal in the microcomputer of the transmitter 1. The process shown in FIG. 3 is executed repeatedly by an interruption at predetermined time intervals.

In steps T1 and T3, it is determined whether the lock button 4 and the unlock button 5, respectively, have been depressed or not. In the case where neither button is depressed, the process shown in FIG. 3 is not executed.

In the case where it is determined in step T1 that the lock button has been depressed, the digits 10 are set in the button code in step T2. In the case where it is determined in step T3 that the unlock button 5 has been depressed, on the other hand, the digits 01 are set in the button code in step T4.

After the button code is set, the ID code stored in the memory is read out (T5), and the time during which the button is kept on is measured (T6). The measured time is determined (T7), and unless the time lasts for at least two seconds, the time code is left at 0 (T9). In the case where the time lasts for two seconds or more, on the other hand, the time code is set to 1 (T8).

As the result of the foregoing process, the demand signal shown in FIG. 2 is produced and transmitted (T10).

In the case where the button is kept depressed, the process shown in FIG. 3 is repeated so that the demand signals are transmitted successively.

In the case where the button is kept depressed for two seconds or longer (Y in T7), the time code turns from 0 to 1 (T8).

Returning to FIG. 1, the receiver 2 is configured of an antenna, a tuner, a CPU, a memory, etc. and is arranged in the vehicle 3. Upon receipt of a demand signal, the receiver 2 outputs a signal for performing the door lock/unlock control operation or the door open/close control operation in accordance with the contents of the demand signal and the input signals from various detection switches.

The input signals include those supplied from a courtesy switch for the door of the driver's seat, a courtesy switch for the door of the front passenger seat, a courtesy switch for the slide door and a courtesy switch for the back door.

The output signals include a signal applied to a lock motor for locking/unlocking each of the four doors, a signal applied to a door motor for opening/closing the slide door, a signal applied to a buzzer for issuing an alarm and a signal applied to a hazard indicator.

Figure 4:
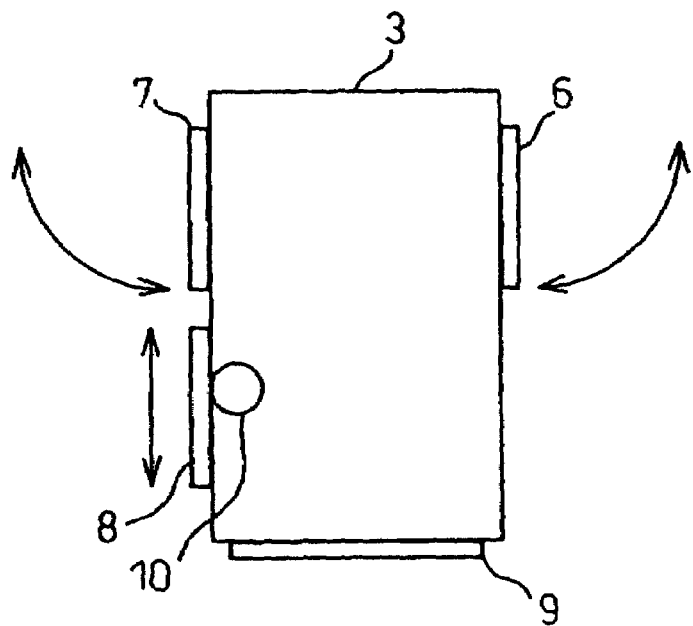
FIG. 4 shows relative positions of the doors of a vehicle to which the system shown in FIG. 1 is applicable.

FIG. 4 shows relative positions of the doors and the door motor of the vehicle 3.

In the shown case, a driver's seat door 6 and a front passenger seat door 7 are arranged in the front part, a slide door 8 on the rear left side and a back door 9 on the back side of the vehicle 3. The slide door 8 is driven to open/close by the door motor 10.

Figure 5:
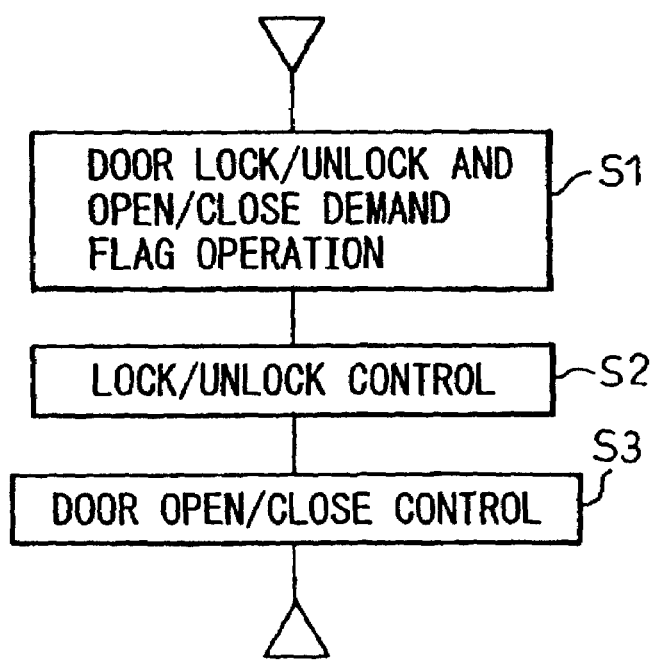
FIG. 5 is a flowchart showing the overall operation of the receiver shown in FIG. 1.

With reference to FIGS. 5 to 8, the operation of the receiver 2 will be explained. FIG. 5 shows the flow of the overall process of operation, and FIGS. 6 to 8 details of each process in the flowchart of FIG. 5.

Figure 6:
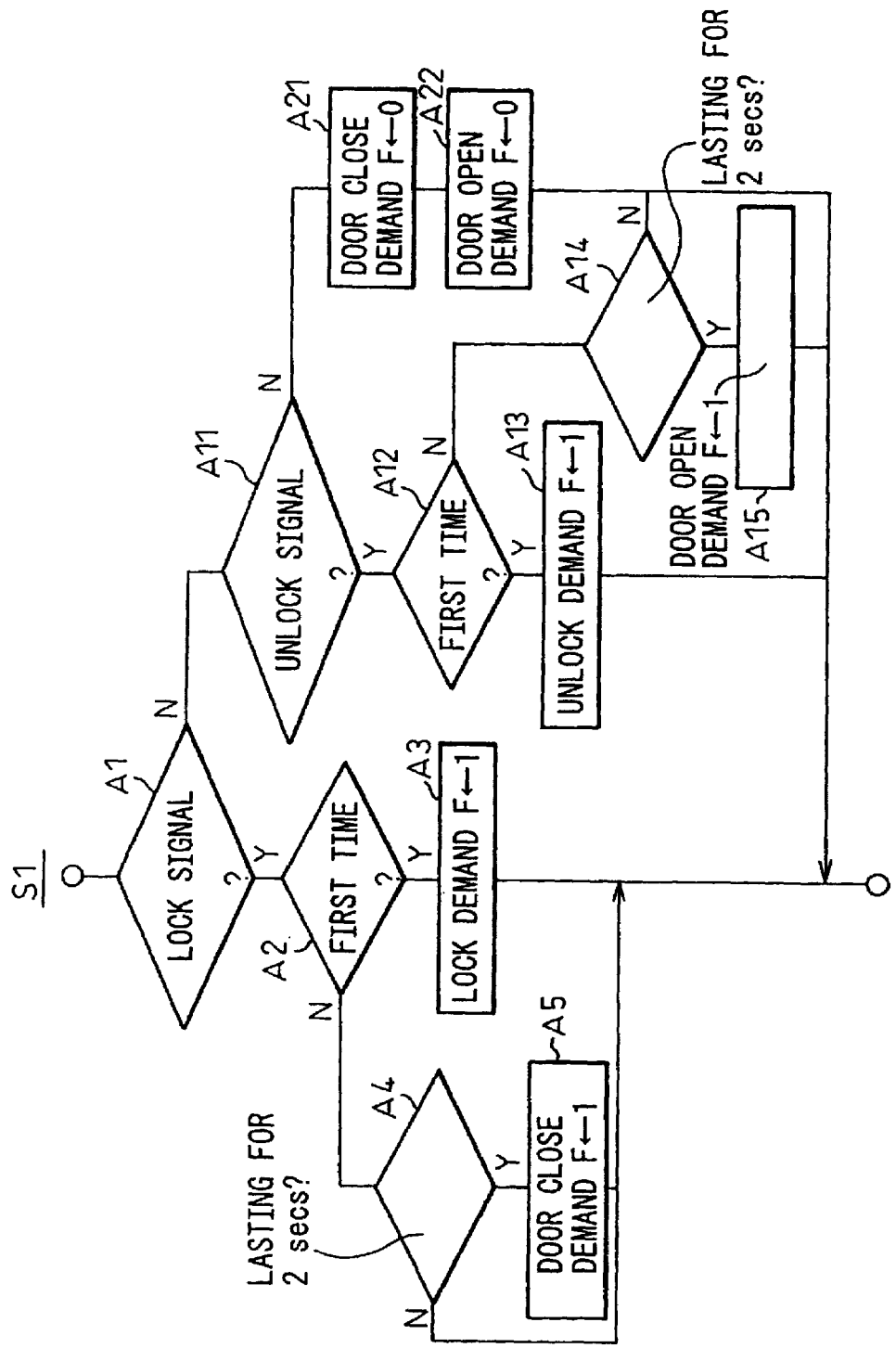
FIG. 6 is a flowchart showing the flag operation in the operating process shown in FIG. 5.
Figure 7:
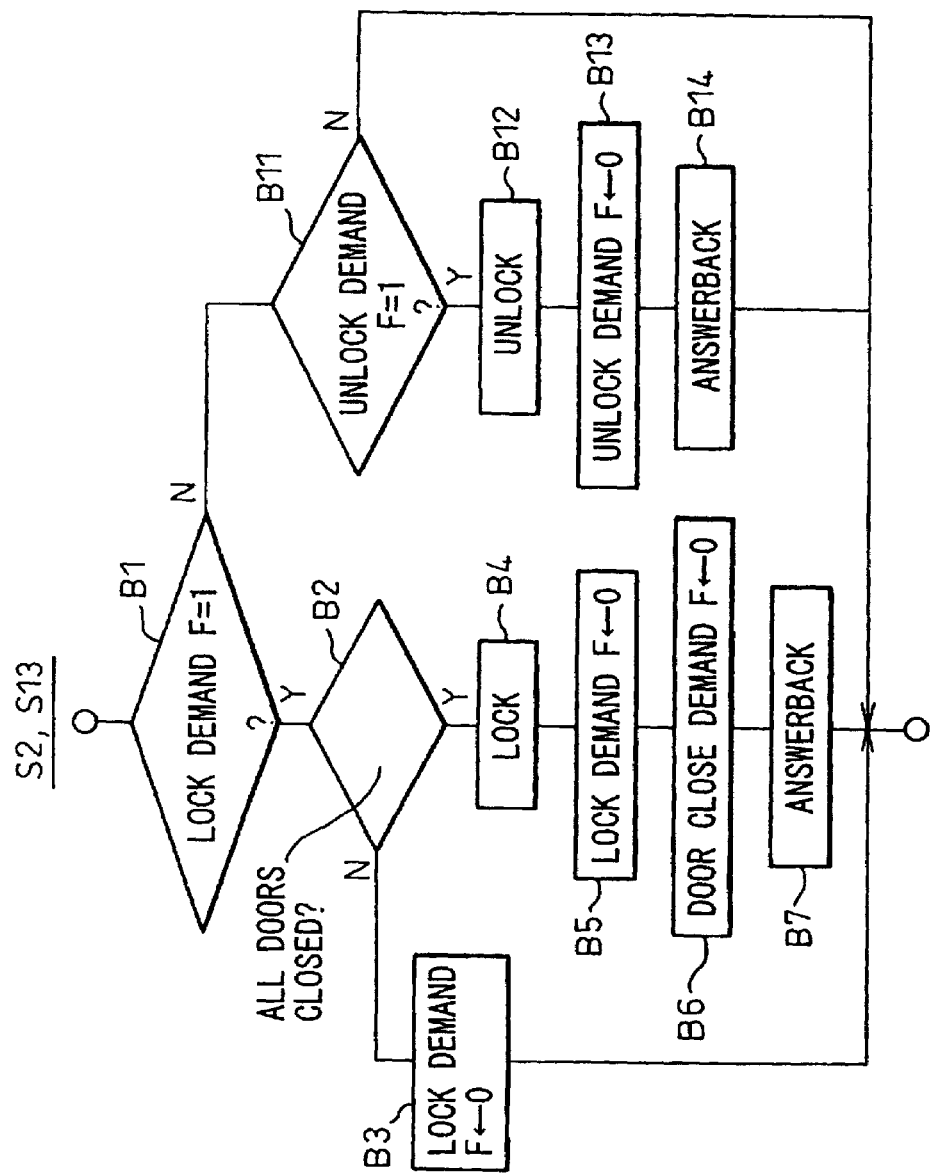
FIG. 7 is a flowchart showing the lock/unlock control process in the operation of FIG. 5.
Figure 8:
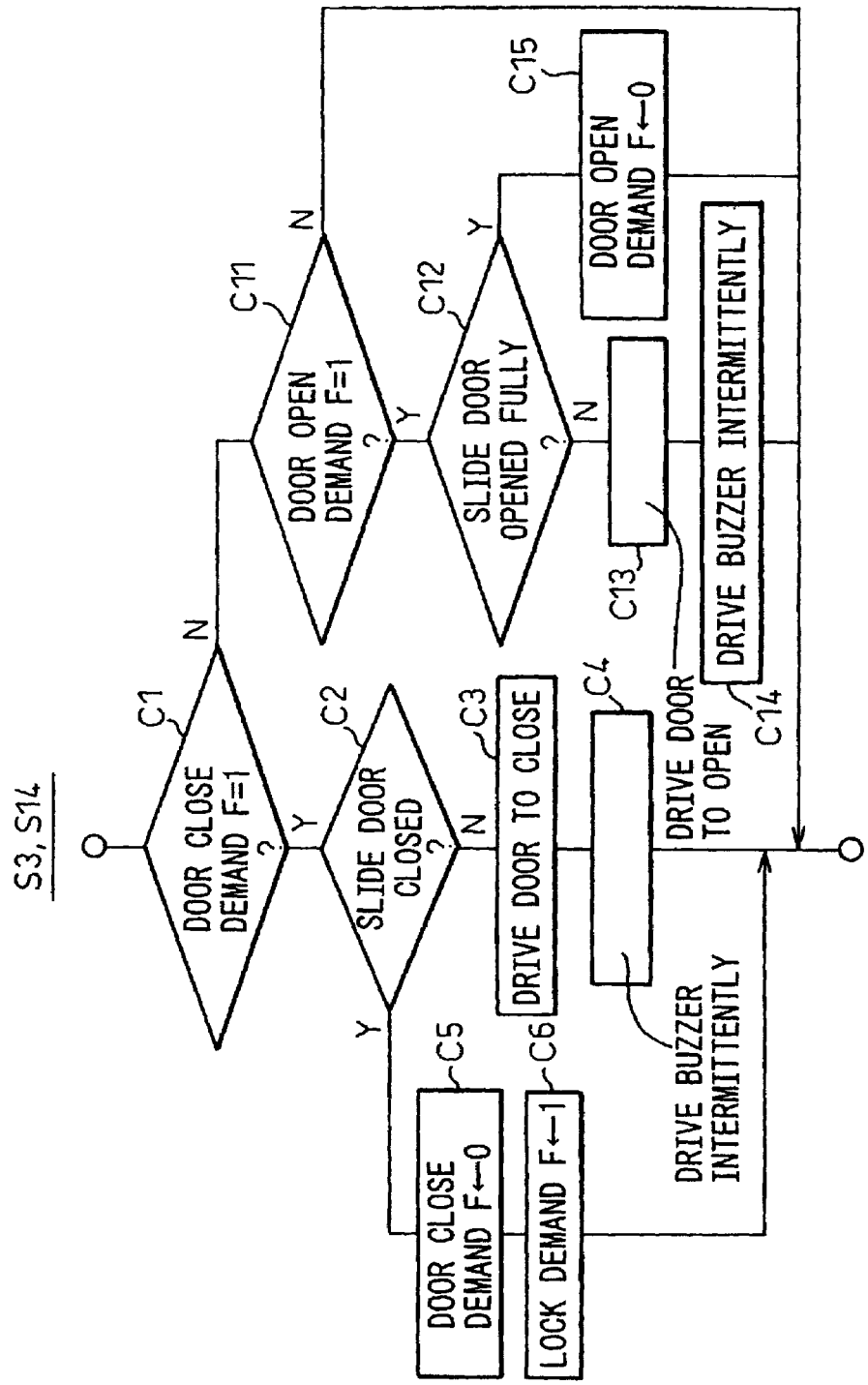
FIG. 8 is a flowchart showing the door open/close drive control process in the operation of FIG. 5.

In these diagrams, step S1 (flag operation) in FIG. 5 is associated with FIG. 6, step S2 (lock/unlock control operation) in FIG. 5 with FIG. 7, and step S3 (door open/close control operation) in FIG. 5 with FIG. 8.

The process shown in these diagrams is repeatedly executed at predetermined time intervals.

In step S1, the door lock/unlock demand flag and the door open/close demand flag are processed based on the button code and the time code of the demand signal.

In step S2, the door lock/unlock control operation is performed based on the door lock/unlock demand flag and the signals from the various detection switches.

In step S3, the door open/close control operation is performed based on the door open/close demand flag and the signals from the various detection switches.

With reference to FIG. 6, the demand flag processing in step S1 will be explained.

It is determined whether the demand signal that has been received is a lock demand signal (A1) or an unlock demand signal (A11). This determination is made in accordance with the button code of the demand signal shown in FIG. 2.

In the case where the received signal is a lock demand signal (Y in A1) and the first such signal received (Y in A2), the lock demand flag is set to 1 (A3). In the case where the received signal is an unlock demand signal and the first such signal received (Y in A12), on the other hand, the unlock demand flag is set to 1 (A13).

After that, if that the door lock demand signal or the door unlock demand signal is received successively thereafter, the receipt of the demand signal ceases to be the initial one, and therefore the process proceeds from step A2 to A4 or from A12 to A14, respectively. In step A4 or A14, it is determined whether the demand signal has lasted for 2 seconds or not (whether the time code is 0 or 1). Until the demand signal lasts for two seconds (N in A4 or A14), the demand flag is not changed and the process proceeds to step S2. In the case where the operation of the button 4 or 5 continues for 2 seconds, on the other hand, the time code of the demand signal becomes 1, and therefore the door close demand flag or the door open demand flag is set to 1 (A5, A15).

In the case where the received signal is neither the door lock demand signal nor the door unlock demand signal (N in A1, A11), both the door close demand flag and the door open demand flag are set to 0 (A21, A22).

Upon completion of processing the demand flag, the process proceeds to the door lock/unlock control operation in FIG. 7.

It is determined whether the lock demand flag is 1 (B1) or the unlock demand flag is 1 (B11). In the case where both demand flags are 0, the door lock/unlock control operation is not performed.

In the case where the lock demand flag is 1 (Y in B1), it is determined whether all the doors 6 to 9 are closed or not (B2). In the case where the answer is Y, the doors are locked (B4), and the lock demand flag is reset to 0 (B5). After the door close demand flag is reset to 0 (B6), the answerback is carried out (B7).

The answerback is for calling the attention of the user, etc. by sounding the buzzer in a different way from the normal door open/close drive operation (described later).

In the case where the answer is N in step B2, the lock demand flag is reset to 0 (B3).

In the case where the unlock demand flag is 1 in step B11, the doors are unlocked (B12) and the unlock demand flag is reset (B13) followed by the answerback (B14).

Upon completion of the door lock/unlock control operation, the process proceeds to the door open/close control operation shown in FIG. 8.

It is determined whether the door close demand flag is 1 or not (C1) and whether the door open demand flag is 1 or not (C11). In the case where both demand flags are 0, the door open/close control operation is not performed.

In the case where the door close demand flag is 1 (Y in C1), it is determined whether the slide door is closed or not (C2). If the answer is N, the slide door is driven to close (C3). During the close drive operation, the buzzer is intermittently sounded (C4). By repeating this process, the slide door is closed (Y in C2), and then the door close demand flag is reset (C5) while the lock demand flag is set (C6).

As a result, all the doors are locked in step B4 through steps B1, B2. Also, as the doors are not driven to close in step C3, no further door close drive operation is performed.

The lock demand flag may be set (step C6) selectively in accordance with the time the button is depressed or the system mode selected.

In the case where the door open demand flag is 1 (Y in C11), it is determined whether the slide door is open fully or not (C12). This determination, which is made by a switch (not shown) for detecting the fully open state of the slide door, may alternatively be carried out by other means. In the case where the answer is N in step C12, the slide door is driven to open (C13), and while being driven to close, the buzzer is sounded intermittently (C14). When the slide door is opened fully (Y in C12) by repeating the above-mentioned process, the door open demand flag is reset (C15). As the door is not driven to open in step C13, no further door open operation is performed.

In the case where the user releases his/her hand from the button of the transmitter while the slide door is being driven, the received signal dies out. Then, the answer in step A1, A11 turns N, and both the door close demand flag and the open demand flag are reset (A21, A22). Thus, the answer turns N in step C1, C11, and the slide door stops being driven.

The process of operation described above is summarized below.

(1) In the case where the lock button 4 or the unlock button 5 is depressed instantaneously (not longer than 2 seconds) in the transmitter 1, the door is only locked or unlocked, respectively. In the case where all the doors 6 to 9 are not closed when the lock button 4 is depressed, the doors are not locked. Nevertheless, an arrangement may be made to lock the doors regardless of whether the doors are open or closed.

(2) In the case where the button 4 or 5 is kept depressed, the doors are first locked or unlocked, as the case may be, and upon lapse of 2 seconds, the slide door 8 is driven to close or open in accordance with whether it is now open or closed, respectively. As the fact that the lock button 4 is kept depressed represents the intention of the user to close the slide door which is open, however, the first session of the door lock operation is not executed and the doors are locked only after being closed.

As an alternative, an arrangement can be made to select whether the doors are to be locked or not at the time point when the slide door is closed. This involves two cases, one in which a different ID code is set by the time length the button is depressed and a combination of the switches operated, and the other in which the receiver is provided with a switching function.

(3) In the case where the button 4 or 5 is released during the open/close drive operation of the slide door 8, the open/close drive operation is suspended at the very moment.

(Modification 1-1)

Figure 9:
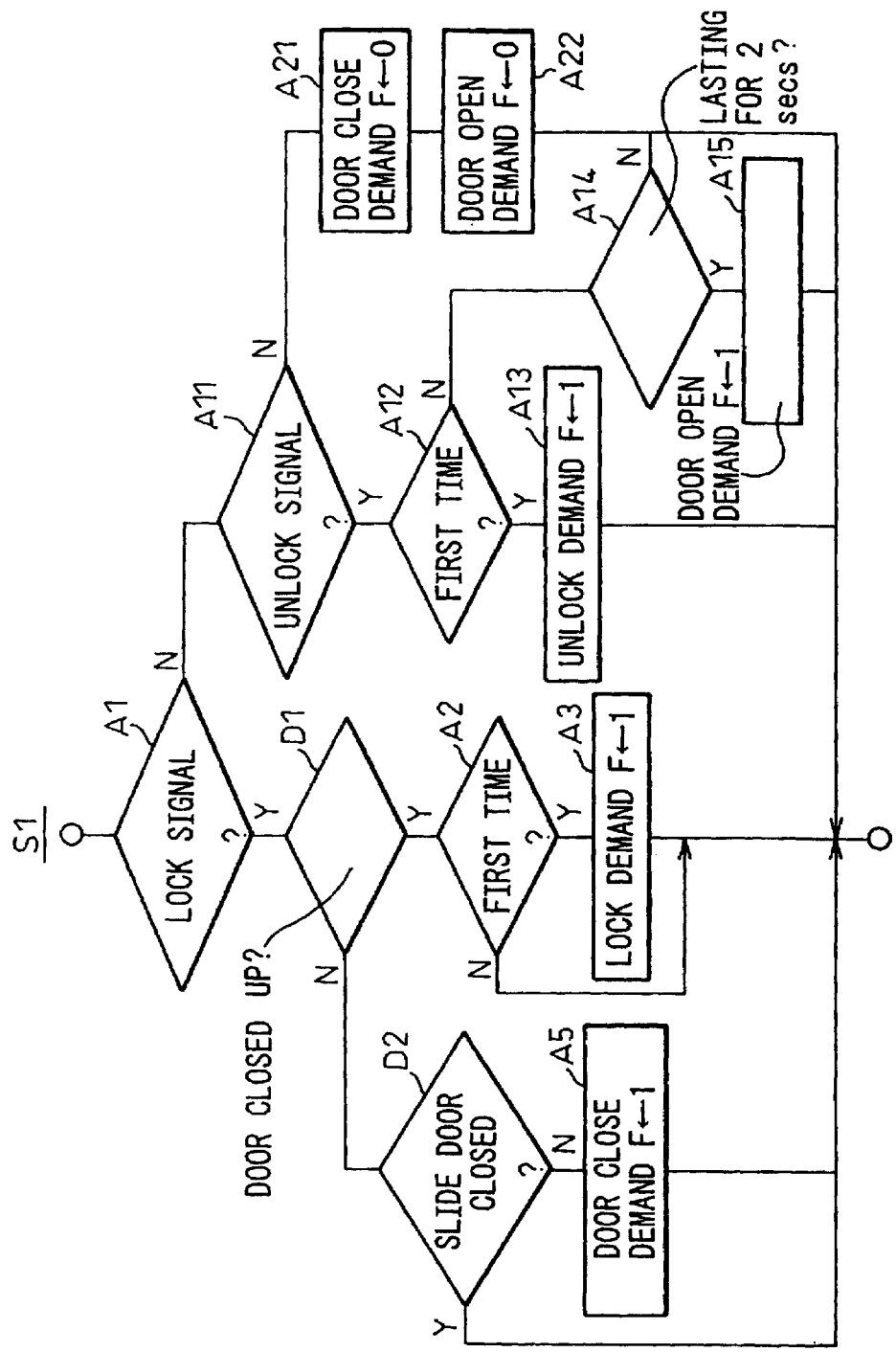
FIG. 9 is a flowchart showing the flag operation according to a first modification of the first embodiment of the invention.

With reference to FIG. 9, a first modification of the first embodiment will be explained.

According to this modification, as soon as the lock button 4 is operated with the slide door 8 open, the operation of driving the slide door 8 to open is started. As a result, as in the first embodiment described above, the slide door is closed within 2 seconds and the doors are locked. In other words, the lock control operation or the slide door close drive control operation is selected not in accordance with the operating mode of the lock button 4 but in accordance with the open/close state of the slide door at the time of receiving the lock signal.

The flow of the whole operation according to this modification is defined as follows:

Step S1 (flag processing operation) in FIG. 5 is associated with FIG. 9, step S2 (lock/unlock control operation) in FIG. 5 with FIG. 7, and step S3 (door open/close control operation) in FIG. 5 with FIG. 8.

An explanation will be given below with reference to FIG. 9 which represents a modification of FIG. 6. In FIG. 9, the same steps as those in FIG. 6 are designated by the same reference numerals as in FIG. 6, respectively, and will not be described again.

In the case where it is determined that the demand signal is for demanding to lock the doors (Y in step A1), it is determined whether all the doors 6 to 9 are closed or not (D1).

In the case where even one of the doors is not closed, it is determined whether the slide door 8 is closed or not (D2). In the case where the slide door is open, the door close demand flag is set to 1 (A5). Before the lapse of 2 seconds, therefore, the door close operation is started immediately by the process shown in FIG. 8.

In the case where all the doors are closed as the result of driving the slide door to close (Y in D1), on the other hand, the lock demand flag is set to control the lock operation.

In the case where the demand signal is for demanding to unlock the doors (A11), the door open demand flag is set after the demand signal lasts for at least 2 seconds, in the same manner as in the process shown in FIG. 6.

Also, according to this modification, steps A21 and A22 can be done without. In that case, once the door open/close drive flag is set to 1, the open/close drive operation is continued until the doors are closed or fully open even if a finger is released from the button 4 or 5.

(Modification 1-2)

A second modification of the first embodiment will be explained with reference to FIG. 10.

According to this modification, the slide door 8, which reaches a predetermined position while being driven to open or close, stops and, upon the lapse of a predetermined time, is restarted to be driven to open or close, respectively.

Figure 10:
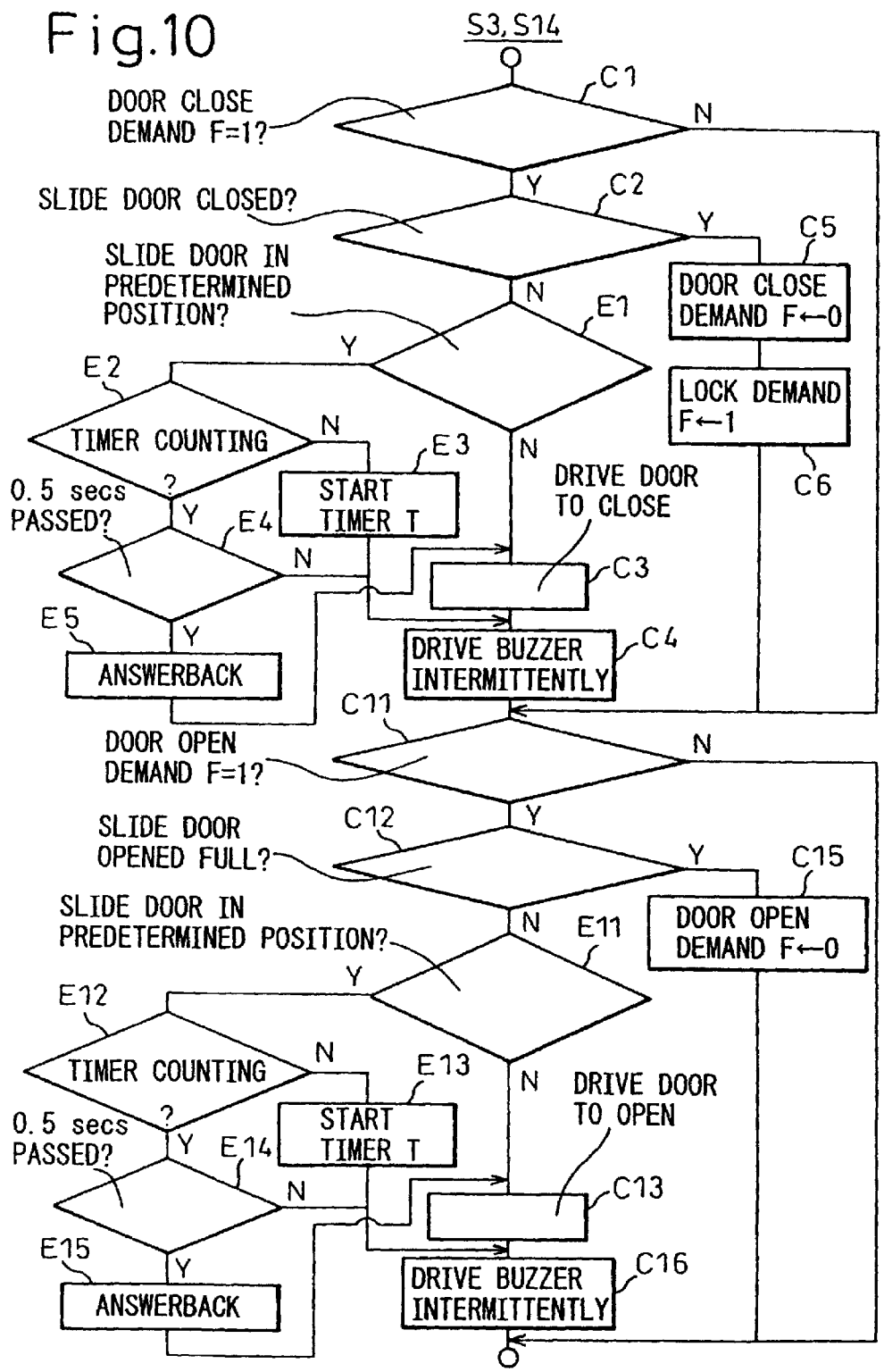
FIG. 10 is a flowchart showing the door open/close control operation according to a second modification of the first embodiment of the invention.

The flow of the whole operation for the system according to this modification is as follows:

Step 1 (flag operation) in FIG. 5 is associated with FIG. 6 or 9, step S2 (lock/unlock control operation) in FIG. 5 with FIG. 7, and step S3 (door open/close control operation) in FIG. 5 with FIG. 10.

In the description with reference to FIG. 10 that follows, the flow of operation shown in FIG. 10 represents a modification of the flow in FIG. 8. In FIG. 10, therefore, the same reference numerals as those in FIG. 8 will be designated by the same reference numerals, respectively, and will not be described again.

In the case where the door close demand flag is 1 (Y in C1) and the slide door is open (N in C2), it is determined whether the slide door is in a predetermined position or not (E1). The predetermined position is set appropriately between the closed-up position and the full-open position (such as an intermediate position). The predetermined position may be detected either by a mechanical detection switch or by measuring the time elapsed after starting the closing operation. In the case where the answer is N, the slide door is driven to close (C3).

When the slide door is driven to close and reaches a predetermined position (Y in E1), the timer starts counting (E2, E3), and the process proceeds to step C4. Thus, the buzzer is sounded. Nevertheless, the slide door, which is not driven in step C3, comes to a stop.

Before the timer counts to 0.5 seconds (N in E2), the slide door remains stationary at the predetermined position. Upon the lapse of 0.5 seconds (Y in E2), the answerback occurs (E5) and then the process proceeds to step C3 to resume the close operation of the slide door. Thus, the slide door being driven to close stops for 0.5 seconds upon arrival at the predetermined position and then again begins to be driven to close.

This is also true in the case where the door open demand flag is 1 (Y in C11). It is determined whether the slide door is in a predetermined position or not (E11), and when the slide door reaches the predetermined position (Y in E11), the timer starts counting (E12, E13). Upon the lapse of 0.5 seconds (Y in E12), the slide door is again driven to open (C13).

(Second Embodiment)

With reference to FIGS. 11 to 14, the operation of the receiver 2 according to the second embodiment will be explained.

In the first embodiment described above, the slide door open/close drive operation is stopped when the finger is released from the button 4, 5 of the transmitter 1 during the open/close drive operation of the slide door. According to the second embodiment, in contrast, the slide door open/close drive operation is not stopped even when the finger is released from the button 4, 5, but is forcibly stopped when the button 4, 5 is depressed again.

The system configuration, etc. of this embodiment are similar to those shown in FIGS. 1 to 4.

Figure 11:
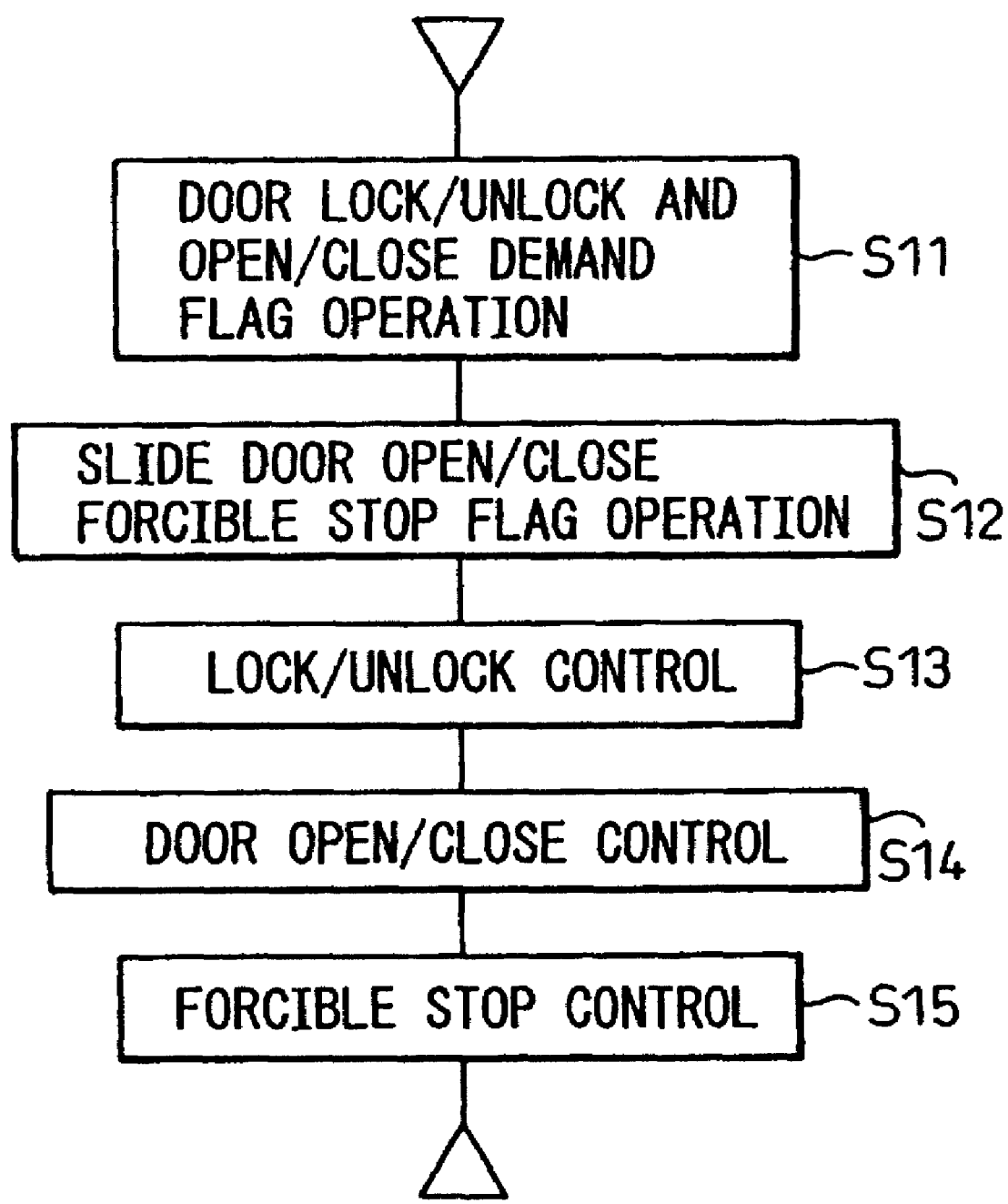
FIG. 11 is a flowchart showing the overall operation according to a second embodiment of the invention.
Figure 12:
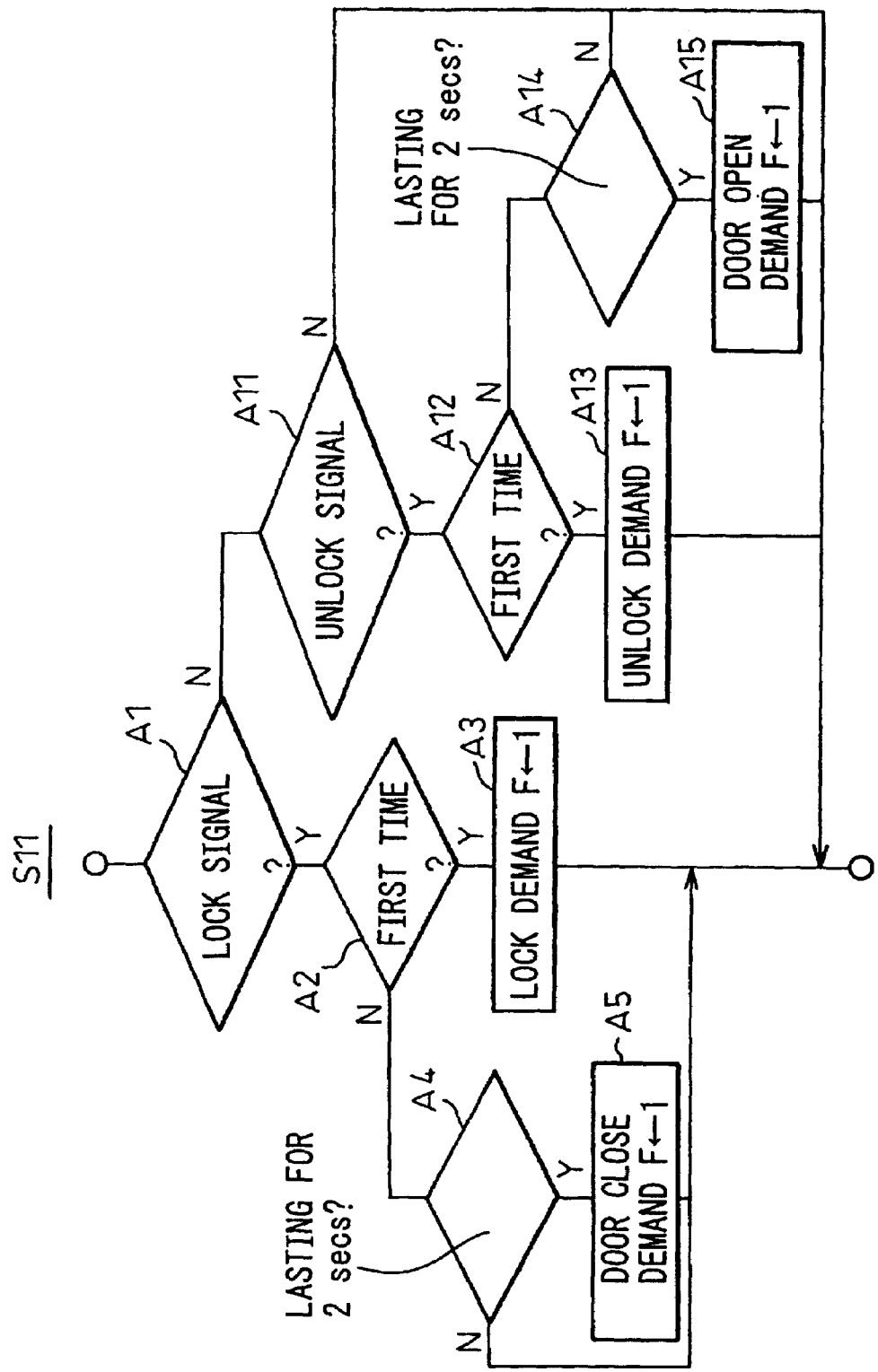
FIG. 12 is a flowchart showing the flag operation in the operating process shown in FIG. 11.
Figure 13:
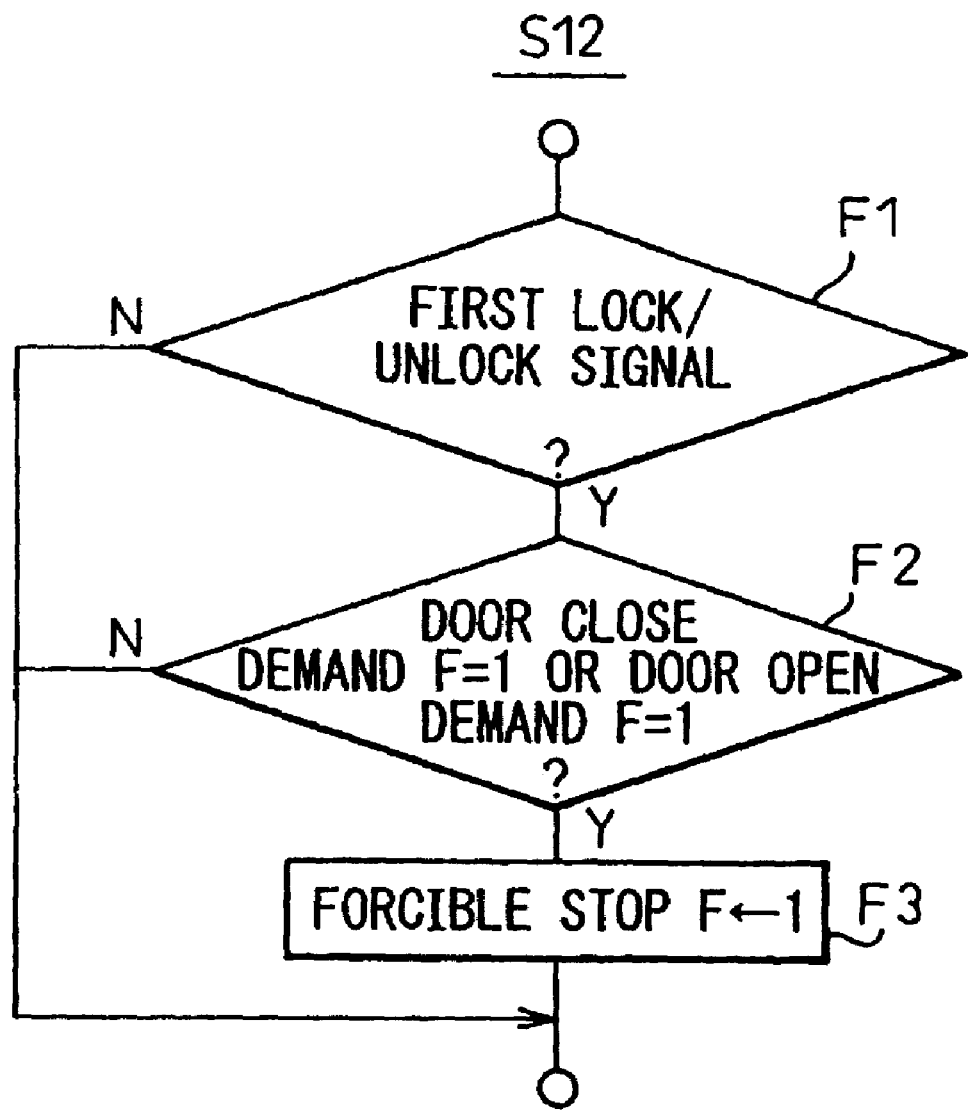
FIG. 13 is a flowchart showing the forced stop flag operation in the operating process shown in FIG. 11.
Figure 14:
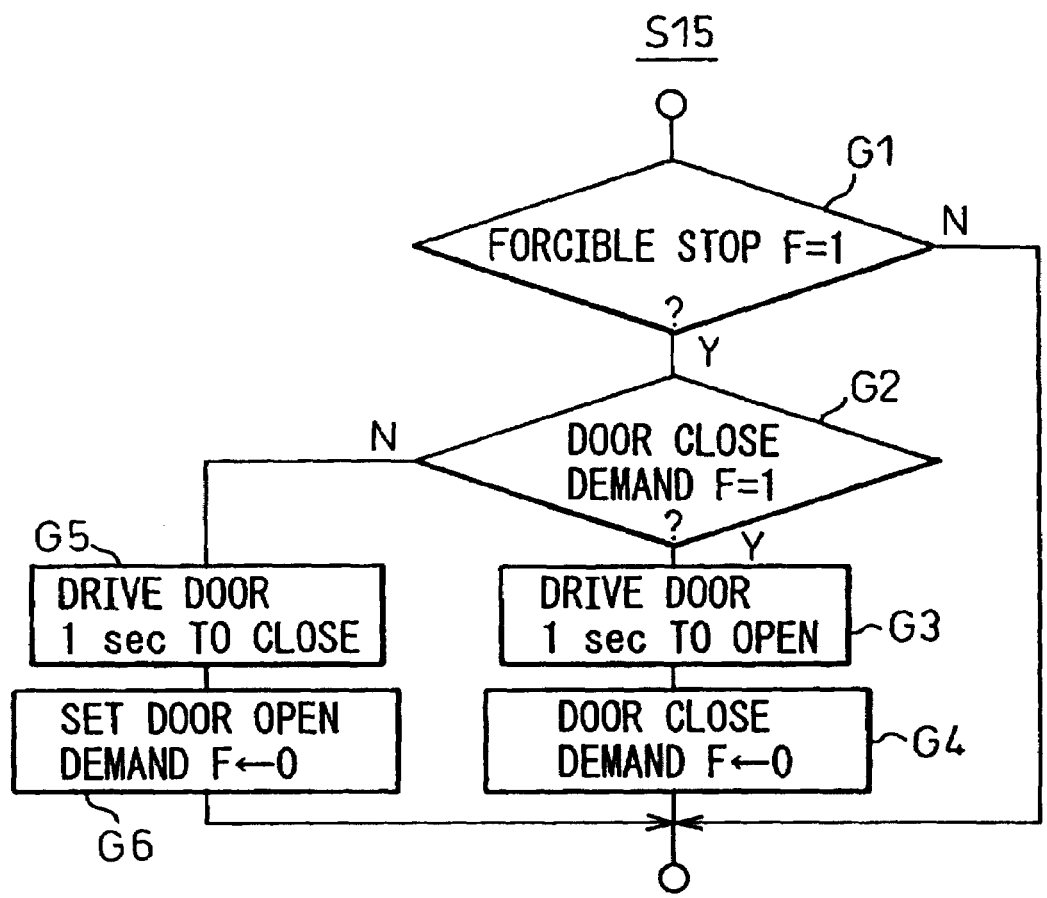
FIG. 14 is a flowchart showing the forced stop control operation in the operating process shown in FIG. 11.

FIG. 11 shows the operation flow of the whole process of the receiver 2, and FIGS. 12 to 14 the details of flow in each part in FIG. 11.

The relation between the parts in each drawing is as follows:

Step 11 (flag processing operation) in FIG. 11 is associated with FIG. 12, step S12 (forcible stop flag processing operation) in FIG. 11 with FIG. 13, step S13 (lock/unlock control operation) in FIG. 11 with FIG. 7, step S14 (door open/close control operation) in FIG. 11 with FIG. 8, and step S15 (forcible stop control operation) in FIG. 11 with FIG. 14.

The process of step S11 is repeatedly executed by interruption at predetermined time intervals.

In step S11, the lock/unlock demand flag and the door open/close drive demand flag are processed.

In step S12, the forcible stop flag for door open/close drive operation is processed.

In step S13, the door lock/unlock control operation is performed.

In step S14, the door open/close drive control operation is performed.

In step S15, the control operation is performed to forcibly stop the door open/close drive operation.

With reference to FIG. 12, the processing operation of the demand flag in step S11 will be explained. The flow of FIG. 12 represents a modification of the flow of FIG. 6. In FIG. 12, therefore, the same steps as those in FIG. 6 are designated by the same reference numerals, respectively, and will not be described again.

In the process shown in FIG. 12, like in the process of FIG. 6, the lock demand flag or the unlock demand flag is set by depressing the button 4 or 5. In the case where either button is kept depressed for at least 2 seconds, the door close demand flag or the door open demand flag is set.

In FIG. 12, steps A21, A22 in FIG. 6 are not shown. According to this embodiment, therefore, even in the case where the finger is released from a button 4, 5 of the transmitter 1 during the open/close drive operation of the slide door, the door open/close demand flag is not reset. As a result, the door open/close process described later fails to stop the drive operation of the slide door until it is fully opened or closed up.

With reference to FIG. 13, the forcible stop flag processing operation in step S12 will be explained.

In step F1, it is determined whether the lock/unlock demand signal has been received for the first time. The receiver 2, when a demand signal is stopped and received again, determines that the demand signal is received for the first time. In step F2, it is determined whether the door open demand flag or the door close demand flag is 1 or not. In the case where the answer is Y in both cases, the forcible stop flag is set to 1. In the case where the answer is N for at least one of the flags, the forcible stop flag is not set.

In the case where the button 4 or 5 is depressed again during the door open/close drive operation (with the door open/close demand flag set), therefore, the forcible stop flag is set by the process shown in FIG. 13.

The specifics of the lock/unlock control operation in step S13 are similar to those of FIG. 7 described above and therefore will not be described again. Specifically, all the doors are locked as long as the lock demand flag is in the state of 1 and all the doors are closed. In the case where the unlock demand flag is 1, the door is unlocked.

The specifics of the door open/close control operation in step S14 are similar to those in FIG. 8 and will not be described again. Specifically, unless the door close demand flag is 1 and the slide door is closed, the door close drive operation is performed. In the case where the door open demand flag is 1 and the slide door is not fully open, on the other hand, the door open drive operation is performed. According to this embodiment, as described above, the door close/open demand flag is not reset and therefore the open/close drive operation is continued even if a finger is released from the button when the slide door is being driven to open or close.

The forcible stop control operation performed in step S15 is as shown in FIG. 14.

In step G1, it is determined whether the forcible stop flag is 1 or not. In the case where the answer is N, the forcible stop is not carried out. In the case where the answer is Y, on the other hand, it is determined whether the door close demand flag is 1 or not (G2). In the case where the answer is Y, the open drive operation is performed in reverse direction for one second (G3), and the door close demand flag is reset (G4).

In the case where the answer is N in step G2, the close drive operation is performed in the reverse direction for only one second (G5), and the door open demand flag is reset (G6).

As the result of the aforementioned process, the open/close drive operation is stopped in the case where the button 4, 5 of the transmitter 1 is depressed during the open/close drive operation of the slide door. At the same time, the slide door stops after being driven in reverse direction for one second. In the case where the slide door is forcibly stopped, something may obstruct the door. By the drive operation in the reverse direction, however, safety can be further improved. The drive operation in reverse direction can be omitted.

(Modification 2-1)

A first modification of the second embodiment will be explained.

According to this modification, the slide door is stopped during the open/close drive operation in the second embodiment, which is resumed in the same direction 0.5 seconds later. This open/close drive control operation is carried out by the aforementioned process of the door open/close control operation in step S14 shown in FIG. 10. The employment of this embodiment leads to the flow of overall operation described below.

Step S11 (flag processing operation) in FIG. 11 is associated with FIG. 12, step S12 (forcible stop flag processing operation) in FIG. 11 with FIG. 13, step S13 (lock/unlock control operation) in FIG. 11 with FIG. 7, step S14 (door open/close control operation) in FIG. 11 with FIG. 10, and step S15 (forcible stop control operation) in FIG. 11 with FIG. 14.

(Modification 2-2)

Figure 15:
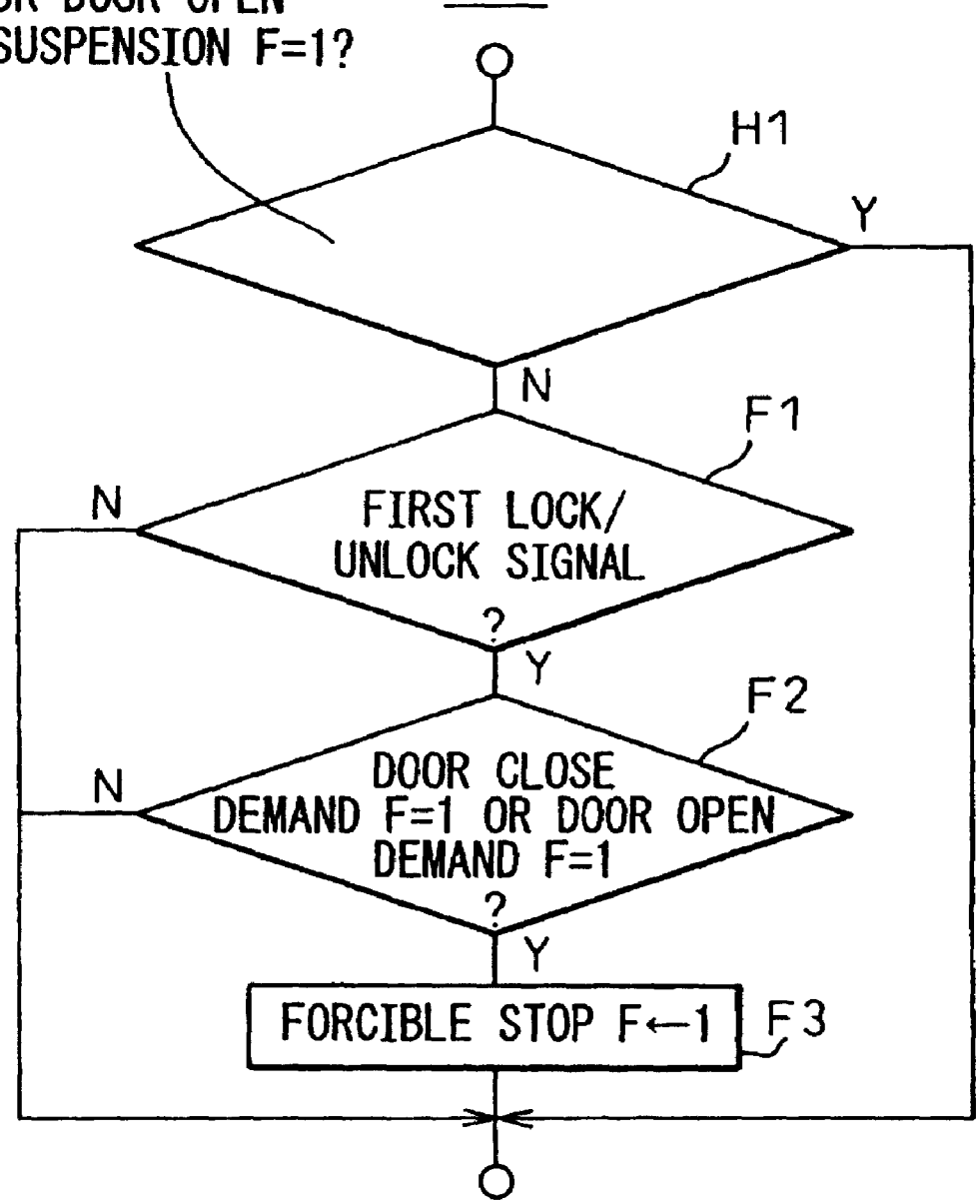
FIG. 15 is a flowchart showing the forced stop flag operation according to a second modification of the second embodiment of the invention.
Figure 16:
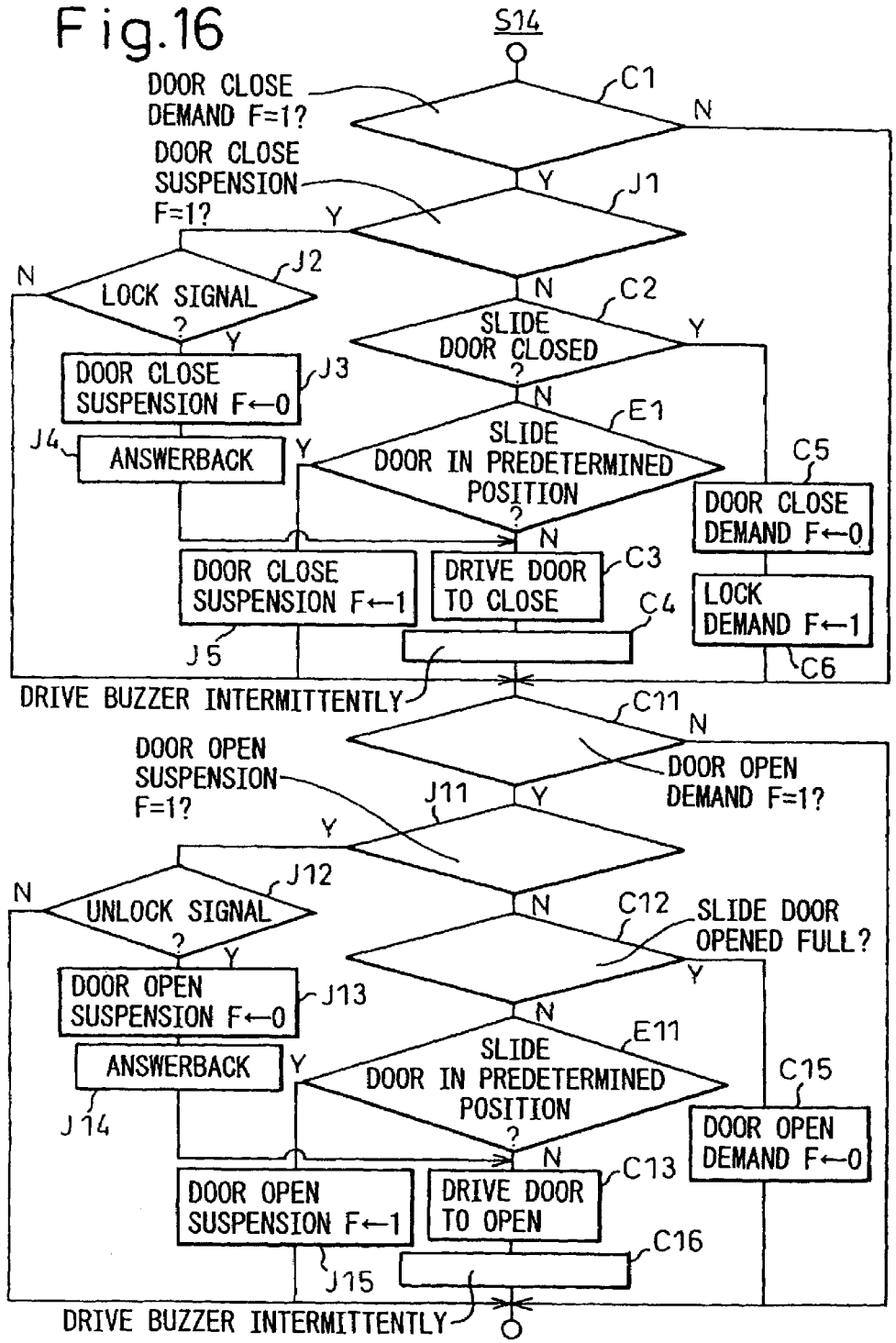
FIG. 16 is a flowchart showing the door open/close drive control operation according to the second modification of the second embodiment of the invention.

With reference to FIGS. 15 and 16, a second modification of the second embodiment will be explained.

According to this modification, the slide door is stopped temporarily during the door open/close drive operation. After that, the open/close drive operation is resumed by operating the button 4, 5 of the transmitter 1 again.

The operation flow of FIGS. 15 and 16 is related to that of other charts as follows:

Step S11 (flag processing operation) in FIG. 11 is associated with FIG. 12, step S12 (forcible stop flag processing operation) in FIG. 11 with FIG. 15, step S13 (lock/unlock control operation) in FIG. 11 with FIG. 7, step S14 (door open/close control operation) in FIG. 11 with FIG. 16, and step S15 (forcible stop control operation) in FIG. 11 with FIG. 14.

With reference to FIG. 15, the operation of processing the forcible stop flag in step S11 will be explained. The operation flow shown in FIG. 15 is a modification of the flow shown in FIG. 13. The same steps in FIG. 15 as those in FIG. 13 are designated by the same reference numerals, respectively, and will not be explained again.

In step H1 before steps F1 to F3 for the forcible stop flag processing operation, it is determined whether the door close suspension flag or the door open suspension flag is set or not. The initial setting of each flag is 0.

The door close suspension flag or the door open suspension flag, as described later, is set to 1 when a predetermined position is reached during the open/close drive operation of the slide door. In the process shown in FIG. 15, the forcible stop flag is not set as long as the door close suspension flag or the door open suspension flag is set.

FIG. 16 shows the process for controlling the door open/close operation according to a modification of FIG. 10 described above. In FIG. 16, therefore, the same steps as those in FIG. 10 are designated by the same reference numerals, respectively, and will not be described again.

When the slide door is driven to close or open and reaches a predetermined position (Y in E1, E11), the door close suspension flag or the door open suspension flag is set (J5, J15). As the process fails to proceed to step C3, C13, the door close or open drive operation is suspended. In the case where the door close flag or the door open flag is set, the answer in step H1 turns N, and therefore even when the lock button or the unlock button is operated again, the forcible stop flag is not set in FIG. 15.

Assume that the user operates a button on the transmitter 1 in this suspended state. Since the lock signal or the unlock signal is received (Y in C1, C11), the process proceeds from step J1 to J2 or from J11 to J12, as the case may be. As far as the received signal is a lock signal in step J2 or an unlock signal in step J12, the door close suspension flag or the open suspension flag, respectively, is reset (J3, J23). This is followed by an answerback for the purpose of an alarm (J4, J24), so that the open/close drive operation (C3, C13) is restarted.

Once the door close suspension flag or the door open suspension flag is set, it becomes possible to set the forcible stop flag subsequently.

Third Embodiment

Figure 17:
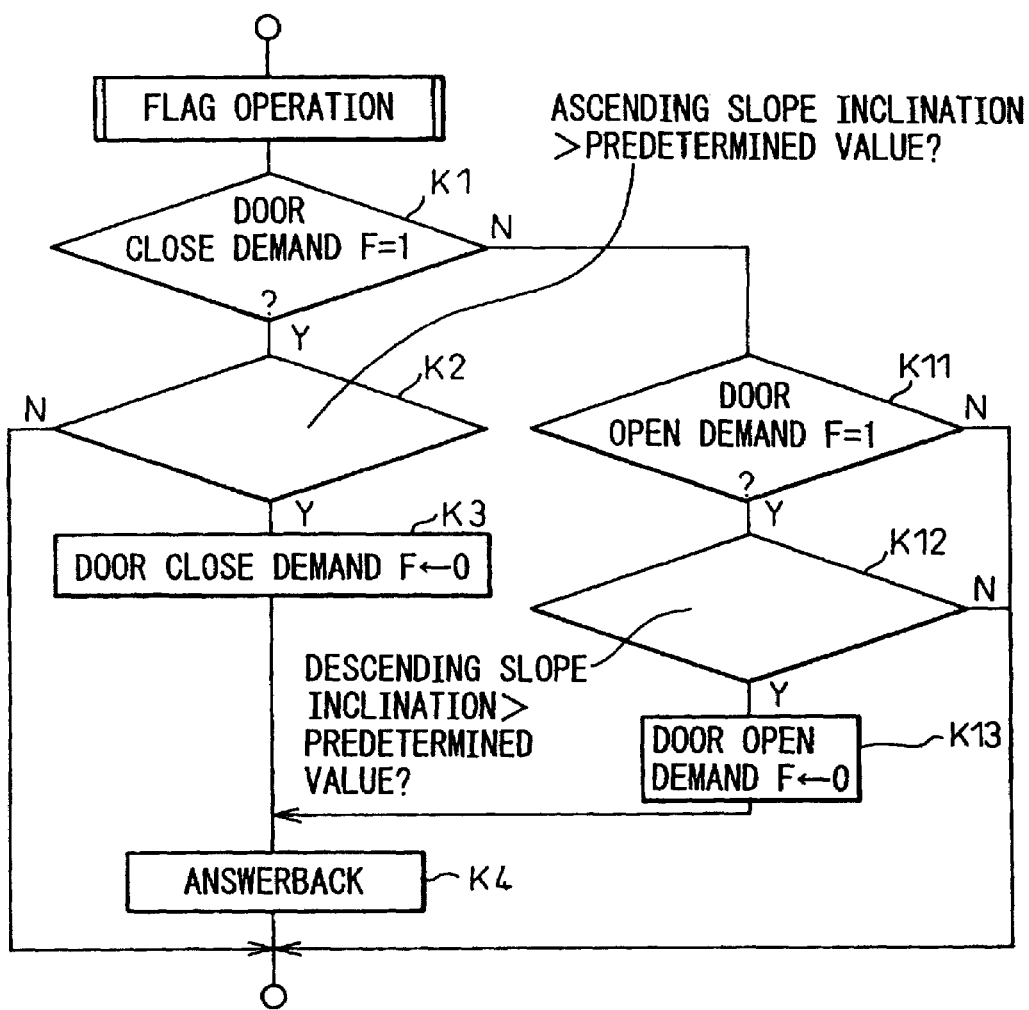
FIG. 17 is a flowchart showing the flag operation according to a third embodiment of the invention.

With reference to FIG. 17, the operation of the receiver 2 according to a third embodiment of the invention will be explained.

According to this embodiment, in the case where the vehicle 3 is stopped on a road of a such a large gradient that an excessively large load is considered to be imposed on the door motor 10 if the slide door 8 is opened or closed, the slide door cannot be driven for opening or closing, as the case may be.

The flow of operation shown in FIG. 17 is added to the last half stage of the flag processing operation flow shown in FIG. 9 or 12. The flow of overall operation of this embodiment based on the first and second embodiments described above is as follows:

(Application to First Embodiment)

Step S1 (flag processing operation) in FIG. 5 is associated with FIG. 6 or 9 and FIG. 17, step S2 (lock/unlock control operation) in FIG. 5 with FIG. 7, and step S3 (door open/close control operation) in FIG. 5 with FIG. 8 or 10.

(Application to Second Embodiment)

Step S11 (flag processing operation) in FIG. 11 is associated with FIGS. 12 and 17, step S12 (forcible stop flag processing operation) in FIG. 11 with FIG. 13, step S13 (lock/unlock control operation) in FIG. 11 with FIG. 7, step S14 (door open/close control operation) in FIG. 11 with FIG. 8, and step S15 (forcible stop control operation) in FIG. 11 with FIG. 14.

Steps 12 to 15 can alternatively be executed in the same way as in modification 2-1 or 2-2.

The operation in FIG. 17 will be explained.

After the flag processing operation in FIG. 6, 9 or 12, it is determined whether the door close demand flag or the door open demand flag is set or not (K1, K11).

In the case where the door close demand flag or the door open demand flag is set (Y in K1, K11), it is determined whether the inclination of the ascending slope or the descending slope of the road detected by an inclination sensor (not shown) exceeds a predetermined value or not (K2, K12). In the case where the road inclination exceeds the predetermined value, the door close demand flag or the door open demand flag is reset (K3, K13), respectively, followed by an answerback (K4, K14).

As a result, the slide door cannot be driven any longer for opening or closing in step S14.

In the case where the road inclination is not more than a predetermined value (N in K2, K12), on the other hand, the door open demand flag or the door close demand flag is not reset. As far as a predetermined condition is satisfied, therefore, the slide door is driven for opening or closing, respectively, in step S14.

Means for detecting the road inclination are not limited to the inclination sensor, but can be other detection methods such as a method using the value of the load current flowing in a motor. In the case where the load current value of the motor is used, a value larger than the value of the current flowing when the slide door is driven on a flat road is used as a criterion (the heavier the motor load, the larger the current value).

(Fourth Embodiment)

With reference to FIGS. 18 to 26, the operation of the door control system according to a fourth embodiment of the invention will be explained.

This embodiment concerns the door control operation of the vehicle 3 having two slide doors, which are driven separately or collectively to open or close by the operation of the transmitter 1.

Figure 18:
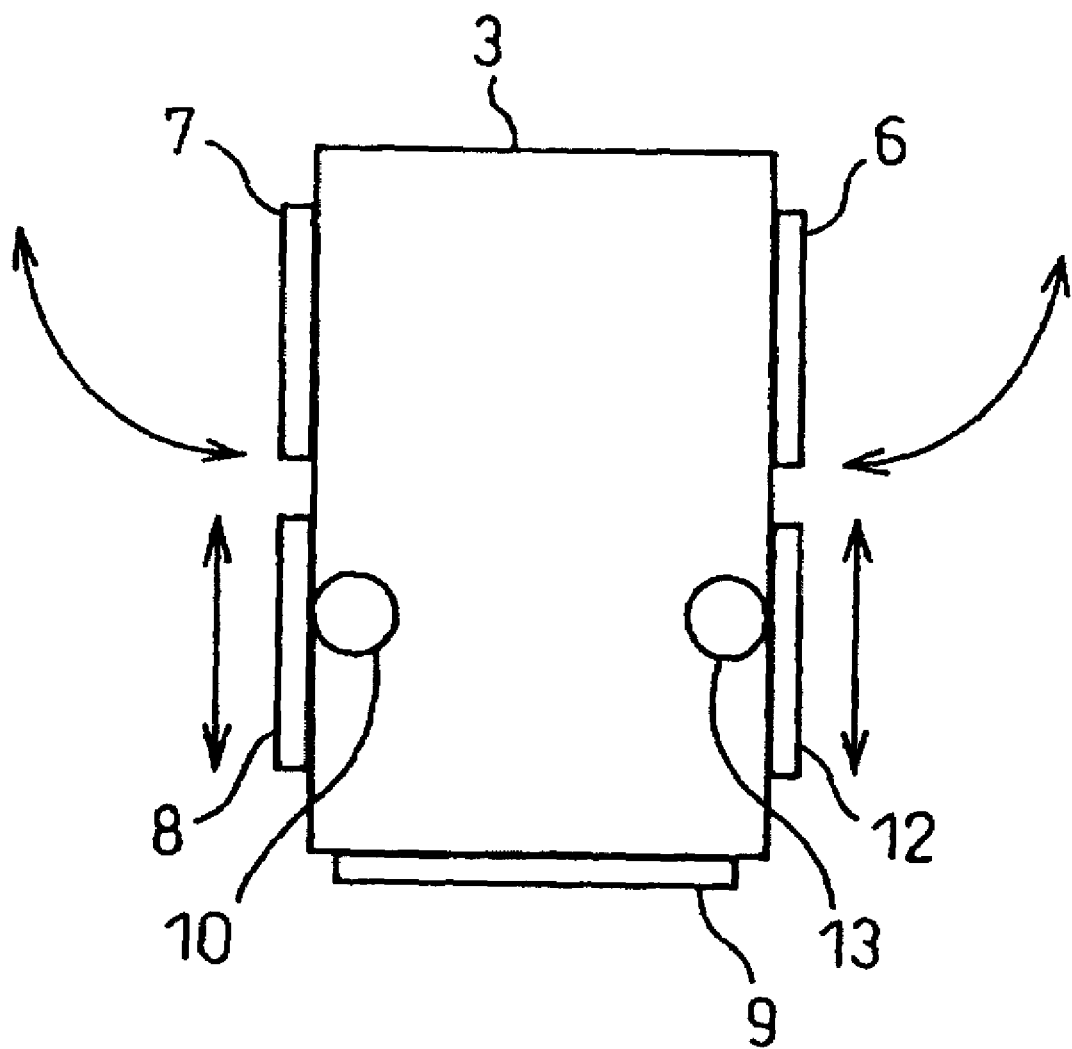
FIG. 18 shows relative positions of the vehicle doors according to a fourth embodiment of the invention.

FIG. 18 shows a vehicle to which this embodiment is applicable. This is similar to the vehicle shown in FIG. 4 according to the aforementioned first embodiment except that it has two slide doors 8 and 12 on left and right sides, respectively.

According to this embodiment, in order to operate the slide doors 8 and 12 separately from each other, a shift button is added to the transmitter, so that the open/close drive operation is performed for one of the two slide doors according to the number of times the shift button is depressed.

Figure 19:
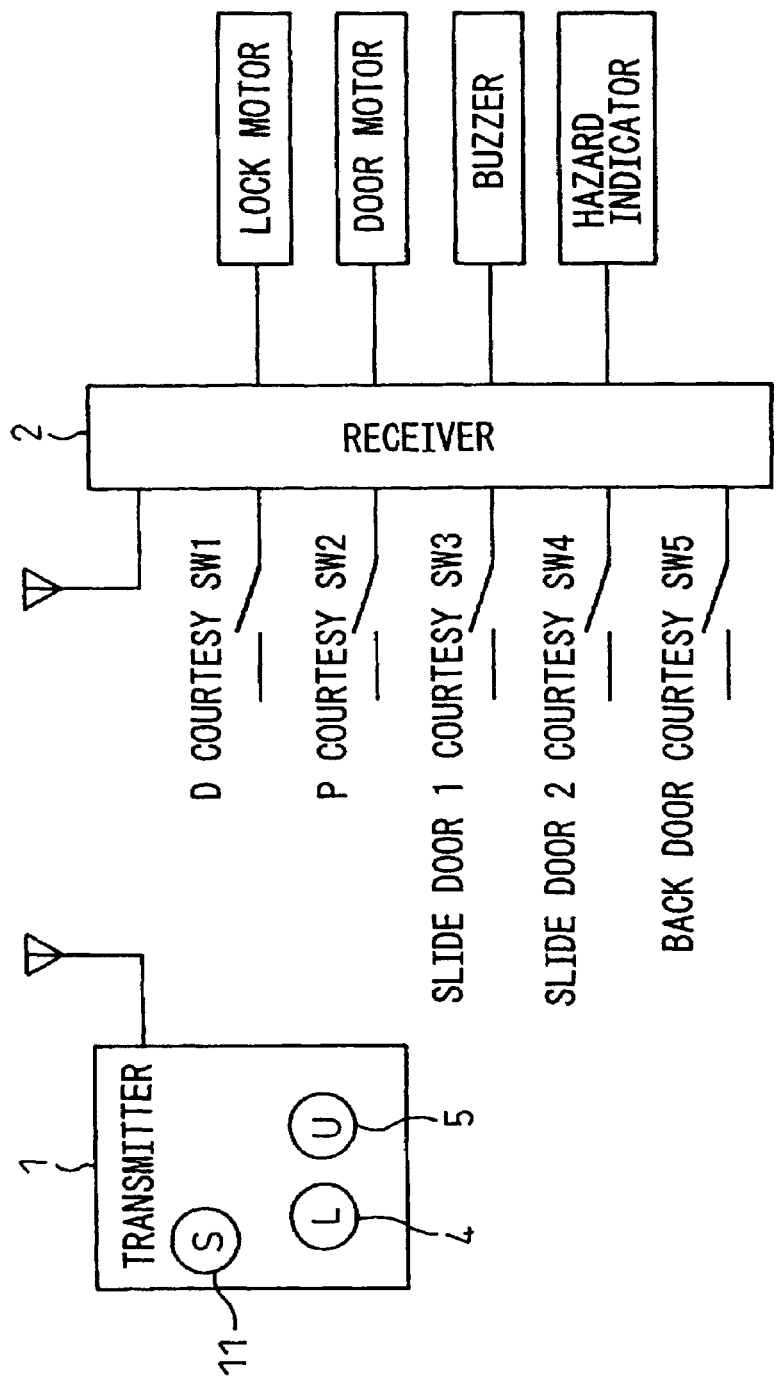
FIG. 19 shows a configuration of a door control system applicable to the vehicle shown in FIG. 18.

FIG. 19 shows a system configuration. This configuration is substantially similar to that shown in FIG. 1 according to the first embodiment and will not be explained again. The only difference lies in that the transmitter 1 has a shift button 11 in addition to the lock button 4 and the unlock button 5.

The receiver 2 is supplied with signals from the slide door courtesy switches SW3, SW4 of the two slide doors, respectively.

FIG. 20 shows a structure of the demand signal transmitted from the transmitter 1.

The ID code, the button code and the time code are identical to those shown in FIG. 2 above. According to this embodiment, a number-of-times code of two bits is added. This number-of-times code indicates the number of times the shift button 11 is depressed before the buttons 4, 5. This number-of-times code assumes the state "00" in the case where the shift button 11 is not depressed, the state "01" in the case where it is depressed once and the state "10" in the case where it is depressed twice.

In this embodiment, the button code, the time code and the number-of-times code are combined to indicate the operation status of the transmitter buttons.

Figure 21:
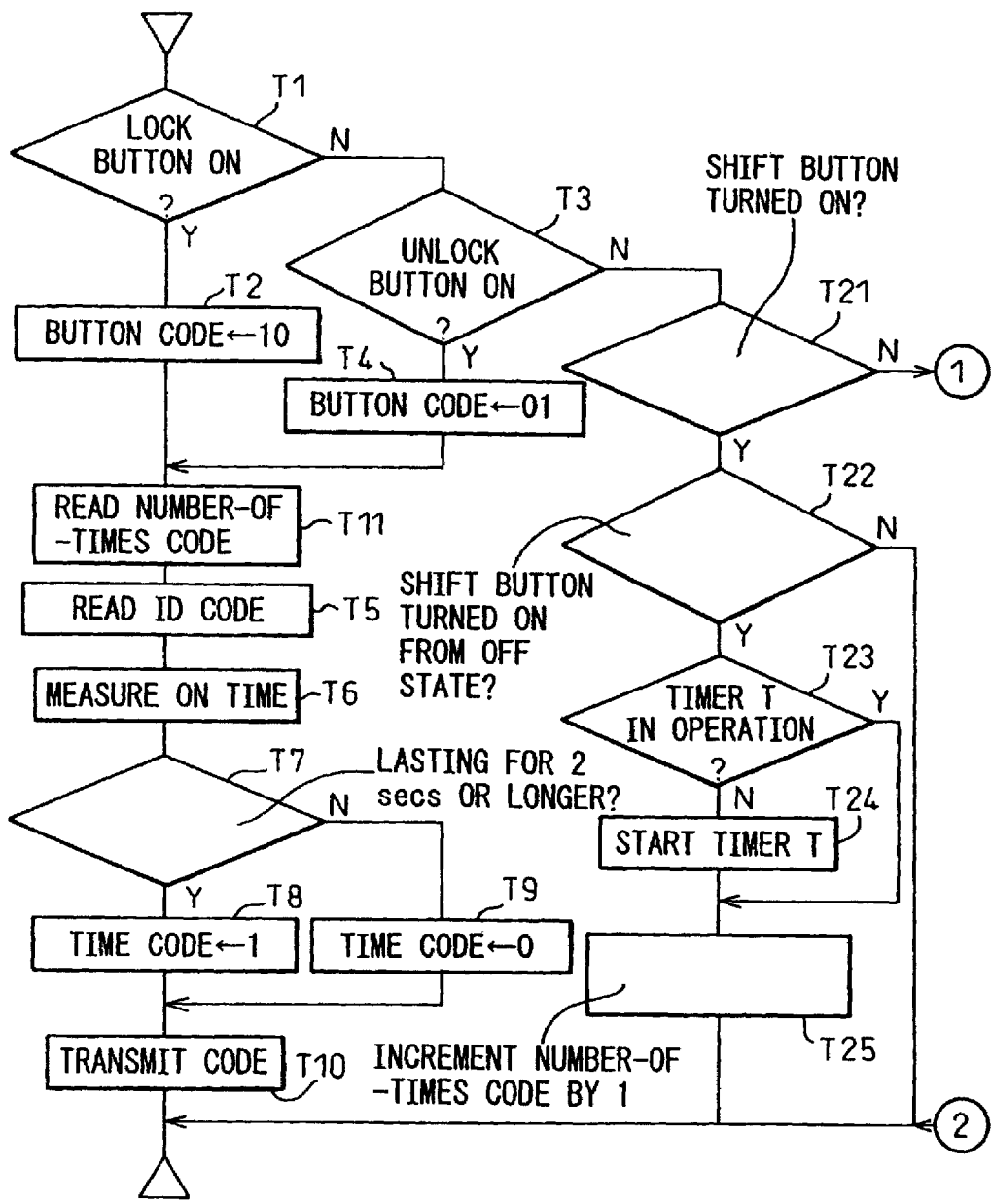
FIG. 21 is a first flowchart showing the operation of the transmitter shown in FIG. 19.
Figure 22:
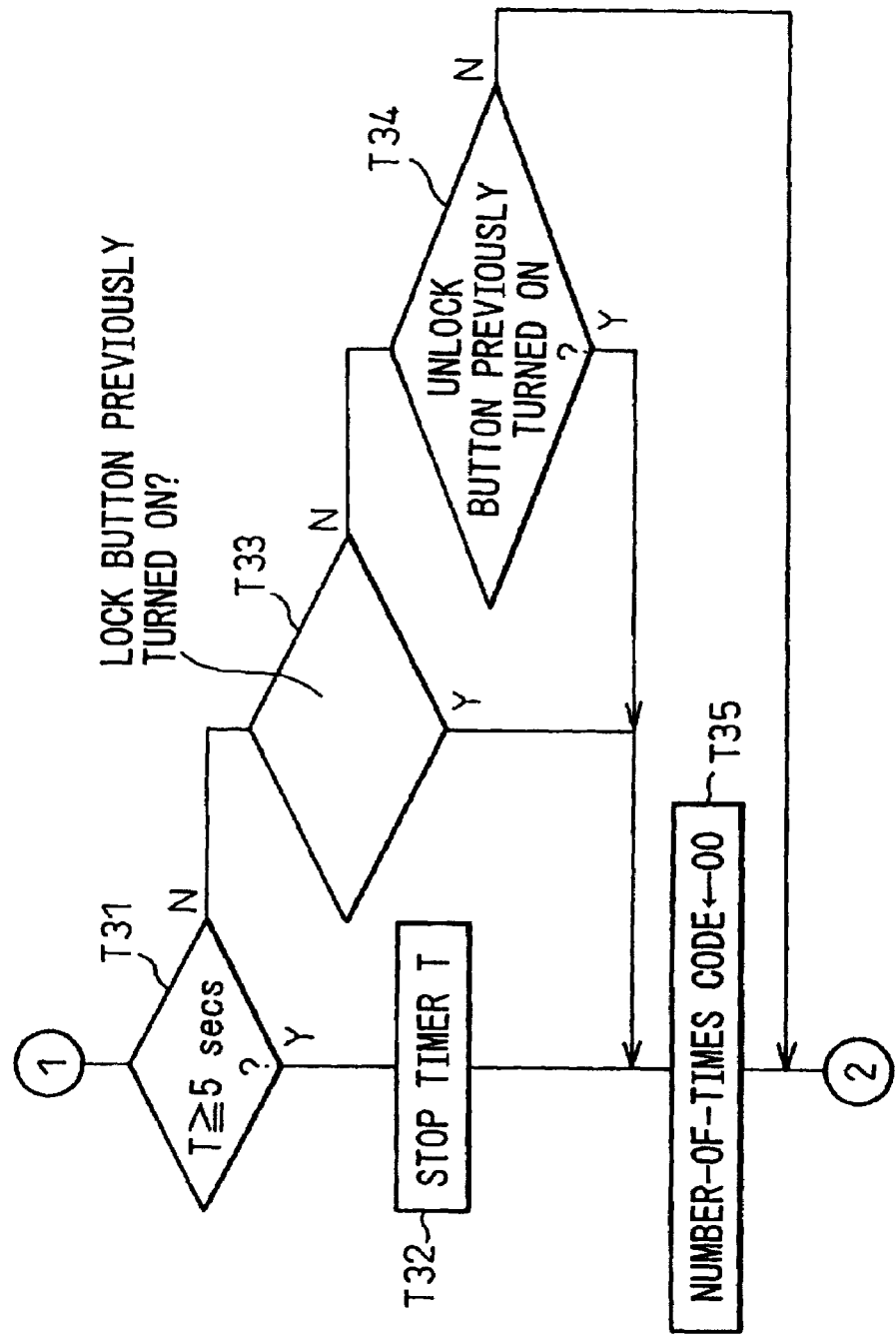
FIG. 22 is a second flowchart showing the operation of the transmitter shown in FIG. 19.

With reference to FIGS. 21 and 22, an explanation will be given of the process for transmitting the demand signal in the microcomputer of the transmitter 1. The shown process is repeatedly executed by interruptions at predetermined time intervals.

Steps T1 to T10 in FIG. 21 is substantially similar to the corresponding steps in the first embodiment described above in FIG. 3. These steps, therefore, are designated by the same reference numerals as in FIG. 3, respectively, and will not be explained any further.

According to this embodiment, in the case where it is not determined that the lock button or the unlock button is operated (N in T1, T3), it is determined whether the shift button is operated or not (T21).

As long as the shift button is depressed, the process proceeds from step T21 to step T22, where it is determined whether the shift button is turned on from the off state. In the case where the shift button is depressed for the first time, the process proceeds to step T23 for determining whether the timer is in operation or not.

Initially, the timer is not in operation, and therefore the process proceeds to step T24 thereby to start the timer. In step T25, the number 1 is added to the number-of-times code.

In the case where the shift button is kept depressed while the process of FIG. 21 is repeated, the answer in step T22 turns N and therefore the number-of-times code remains unchanged.

In the case where the shift button turns off while the process of FIG. 21 is repeated, on the other hand, the process proceeds from step T21 to step T31. The steps including and subsequent to step T31 will be described later.

In the case where the shift button is depressed again after being turned off, the process proceeds from Y in step T21, Y in T22 and Y in T23 to step T25, where another number 1 is added to the number-of-times code.

In the case where the lock button or the unlock button is depressed (Y in T1, T3) after the number of times the shift button is operated is stored in the number-of-times code, the demand signal is transmitted by the process of steps T2 and T4 to T10.

According to this embodiment, step T11 is inserted before step T5 to read the number-of-times code. Therefore, the demand signal transmitted in step T10 assumes the state shown in FIG. 20, and the number of times the shift button is depressed is contained in the number-of-times code.

Once the shift button turns off, the process proceeds to step T31, where it is determined whether the count on the timer is shorter than 5 seconds or not. This timer is started in step T24.

Unless the lock button or the unlock button is depressed after the shift button turns off, the timer is stopped (T32) after the lapse of 5 seconds (Y in T31), and the number-of-times code is reset to 00 (T35).

As a result, even in the case where the shift button is depressed by error, the number-of-times code is reset upon the lapse of 5 seconds. Thus, an erroneous demand signal is prevented from being transmitted.

If the lock button or the unlock button is operated after the shift button and the transmission of the demand signal is restored to normal state, in the next process, it is determined in step T33 or T34 that the lock button 4 or the unlock button 5 has been previously operated, and therefore the process proceeds to step T35 thereby to reset the number-of-times code.

As the result of the aforementioned process, the operation of the buttons 4, 5, 11 and the demand signal are related to each other as follows:

Upon operation of the lock button 4 or the unlock button 5, the lock or unlock, as the case may be, is set in the button code. In the case where the operating time exceeds 2 seconds, the time code is set to 1.

If the shift button 11 is operated before the lock button or the unlock button, the number of times the shift button 11 is so operated is set in the number-of-times code. The number-of-times code is reset after operating the lock button or the unlock button, respectively, and transmitting the demand signal.

In the case where 5 seconds passes after operating the shift button without operating the lock button or the unlock button, the number-of-times code is reset.

With reference to FIGS. 23 to 26, the operation of the receiver 2 according to this embodiment will be explained.

Figure 23:
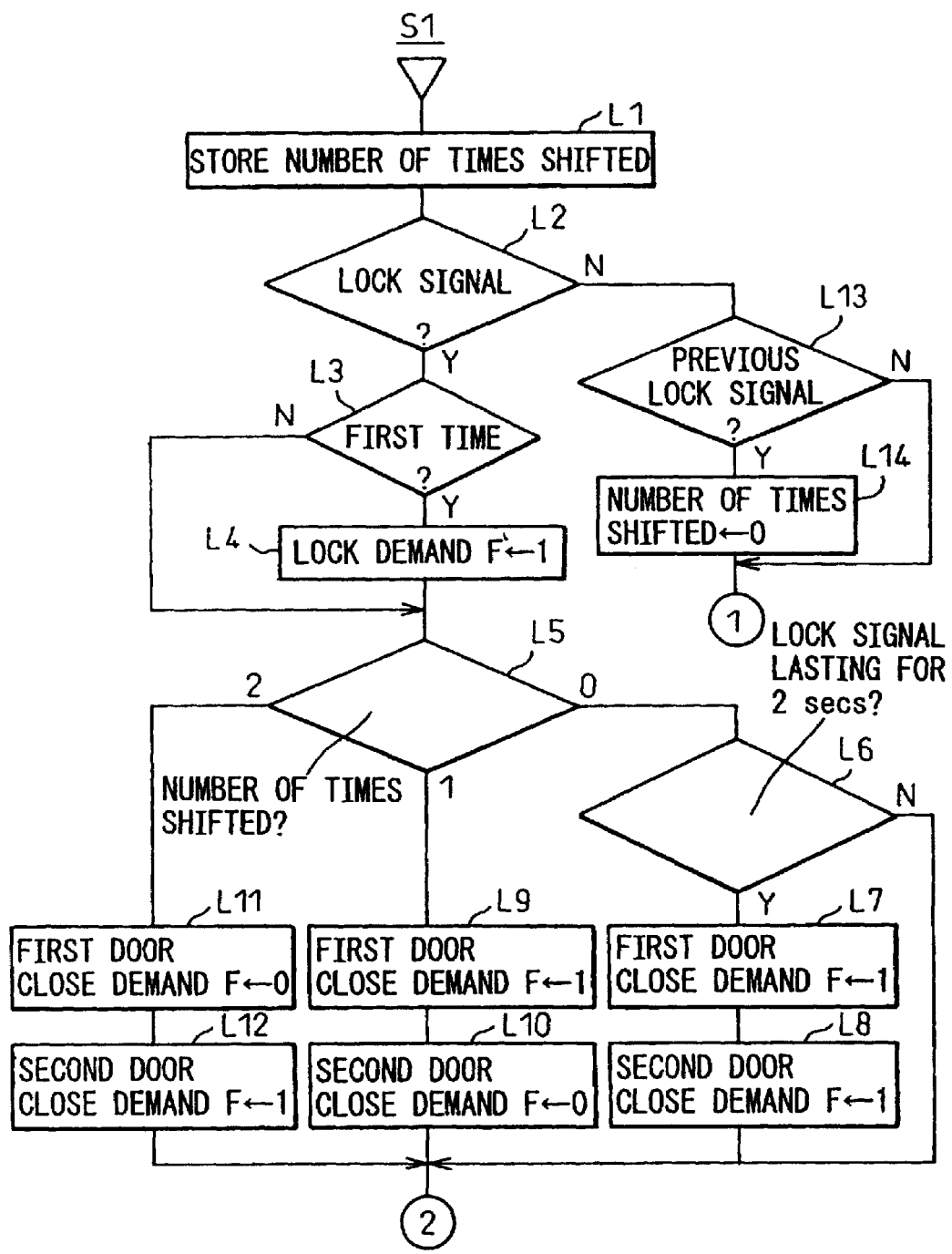
FIG. 23 is a flowchart showing a first flag operation of the receiver shown in FIG. 19.
Figure 24:
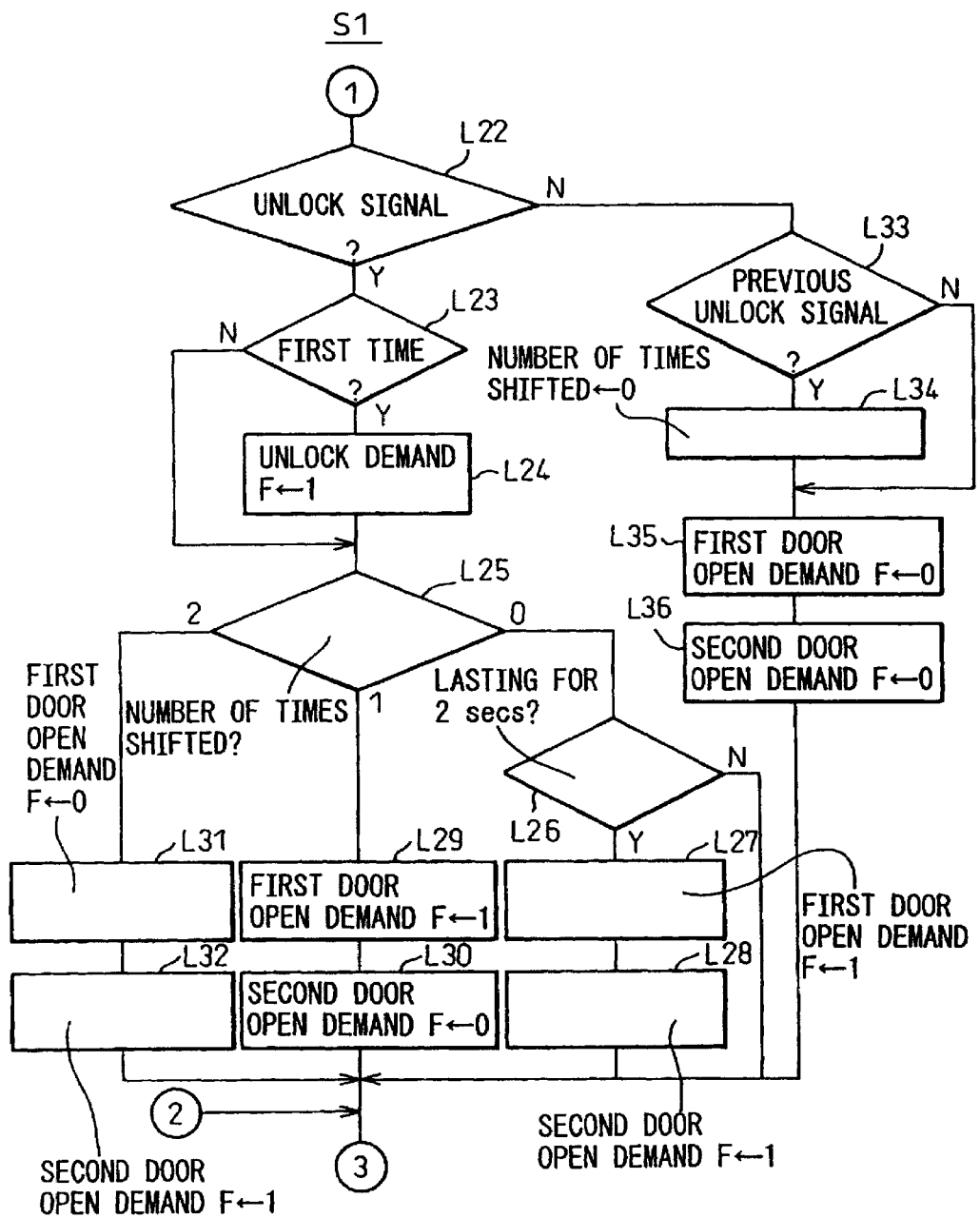
FIG. 24 is a flowchart showing a second flag operation of the receiver shown in FIG. 19.
Figure 25:
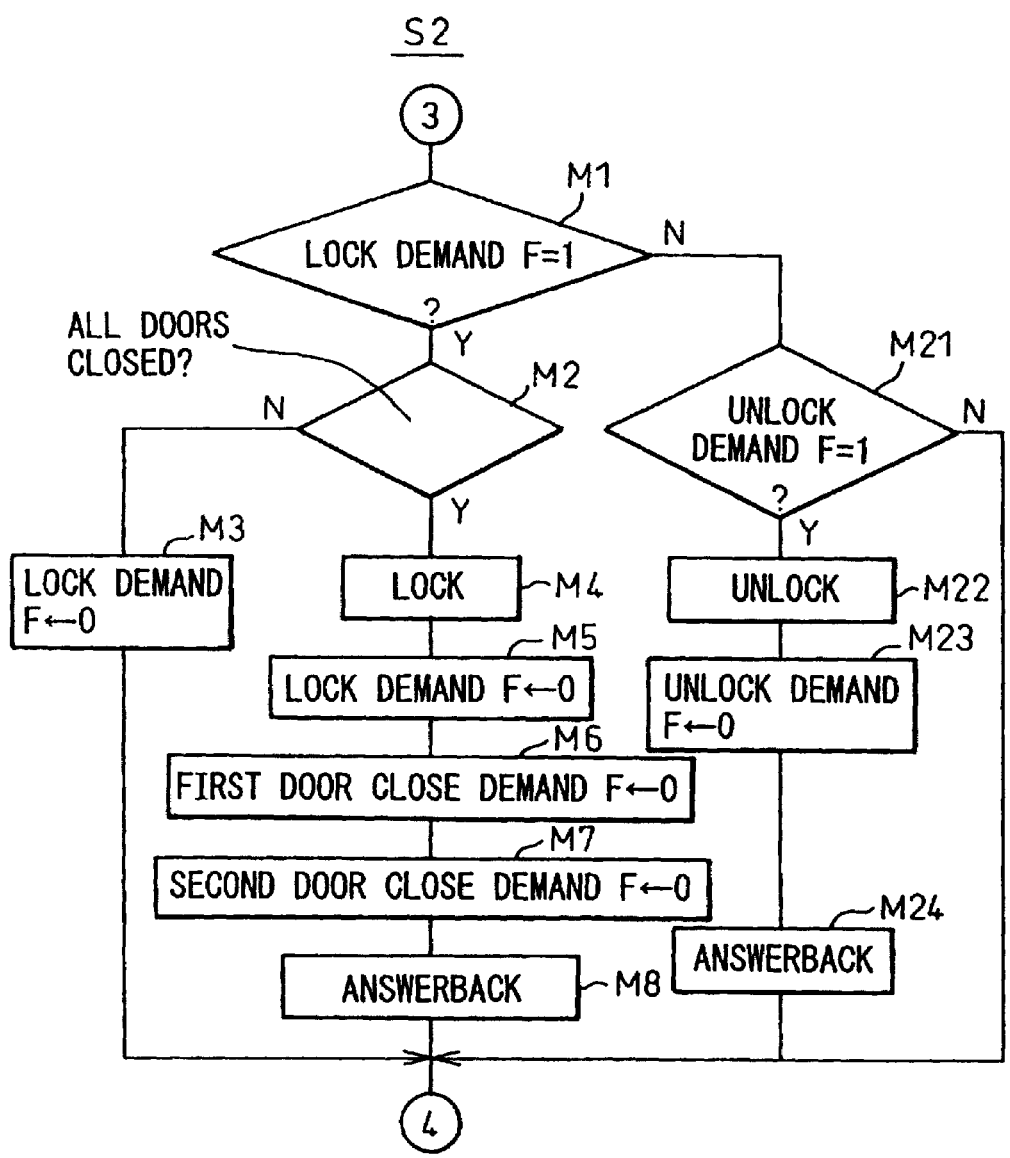
FIG. 25 is a flowchart showing the lock/unlock control operation of the receiver shown in FIG. 19.
Figure 26:
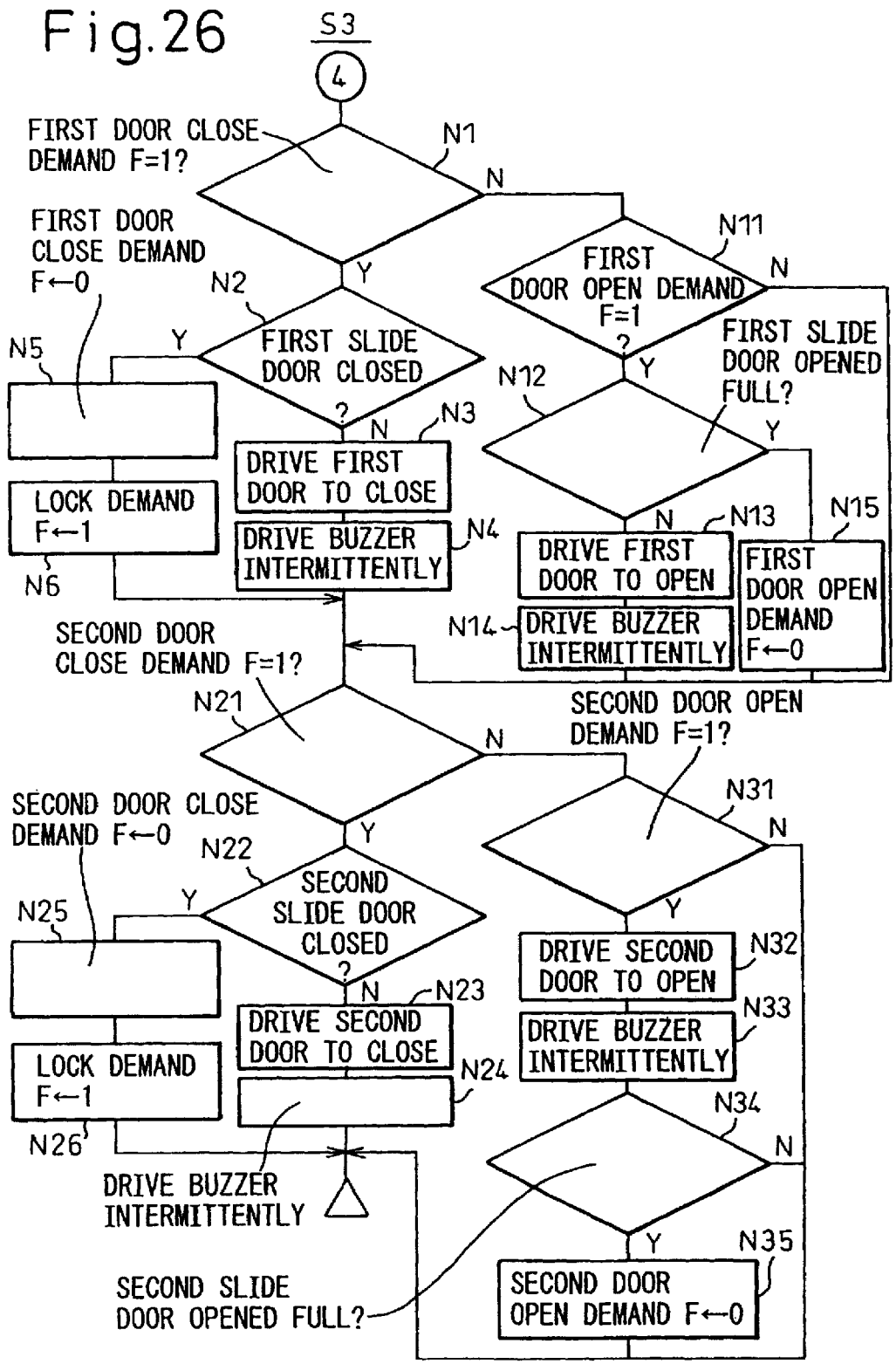
FIG. 26 is a flowchart showing the door open/close control operation of the receiver shown in FIG. 19.

The flow of the whole operation of the receiver 2 is shown in FIG. 5 according to the first embodiment described above. The relation between FIG. 5 and FIGS. 23 to 26 is as follows:

Step S1 (flag processing operation) in FIG. 5 is associated with FIGS. 23, 24, step S2 (lock/unlock control operation) in FIG. 5 with FIG. 25, and step S3 (door open/close control operation) in FIG. 5 with FIG. 26.

Referring to FIGS. 23 and 24, the flag processing operation will be explained.

Upon receipt of the demand signal, the number of times the shift button is operated contained in the number-of-times code is stored (L1).

It is determined whether the demand signal is a lock signal or not (L2). In the case where the answer is Y, it is determined whether the particular demand signal is received for the first time or not (L3). In the case where the receipt of the demand signal is the first one, the lock demand flag is set to 1 (L4) and the number of times shifted is determined (L5). In the case where it is determined in step L3 that the demand signal has been received more than once, on the other hand, the process directly proceeds to step L5.

In the case where the number of times shifted is 0 (0 in L5), it is determined whether the lock signal has lasted for at least 2 seconds or not (time code 1) (L6). In the case where the answer is N, the door open/close flag is not operated. In the case where the answer is Y, on the other hand, the close demand flags for the first and second slide doors are set to 1 (L7, L8).

In the case where the number of times shifted is 1 (1 in L5), the close demand flag of the first slide door is set (L9) while the open demand flag for the second slide door is reset (L10). Also, in the case where the number of times shifted is 2 (2 in L5), the close demand flag for the first door is reset (L11) while the open demand flag for the second door is set (L12).

In the case where the receipt demand signal is not a lock signal in step L2, it is determined in step L12 whether the lock signal is received or not in the previous session, i.e. whether the lock button has just turned off from on state (L13). In the case where the answer is Y, the stored number of times shifted is reset to 0 (L14), and the process proceeds to FIG. 24. The process proceeds also to FIG. 24 in the case where the received signal is not a lock signal for both the current session and the previous session.

When the process proceeds to FIG. 24, it is determined whether the received signal is an unlock signal or not (L22). In the case where the answer is Y, like the process of FIG. 23, the unlock demand flag is processed (L24), and so is the open demand flag or the close demand flag for the first door or the second door (L27 to L32).

In the case where the received signal is neither a lock signal nor an unlock signal (N in L1, L22), on the other hand, it is determined whether the unlock signal is received in the previous session, i.e. whether the unlock button has just turned off from on state (L33). In the case where the answer is Y, the number of times shifted is reset (L34), after which the open demand flag for the first door is reset (L35) and the close demand flag for the second door is reset (L36).

With reference to FIG. 25, the lock/unlock control operation will be explained.

It is determined whether the lock demand flag or the unlock demand flag is 1 or not (M1, M21). In the case where the lock demand flag is 1 (Y in M1), it is determined whether all the doors 6 to 9 and 12 are closed or not (M2). In the case where even a single door is open, the lock demand flag is reset (M3). In the case where all the doors are closed, on the other hand, the doors are locked (M4), the lock demand flag is reset (M5) and the close demand flags for the first and second doors are set (M6, M7) followed by the answerback (M8).

In the case where the unlock demand flag is 1 (Y in M21), the doors are unlocked (M22) and the unlock demand flag is reset (M23) followed by the answerback (M24).

In the case where neither the lock demand flag nor the unlock demand flags is 1, the neither the lock process nor the /unlock process is executed.

With reference to FIG. 26, the open/close control operation of the slide doors will be explained.

It is determined whether the close demand flag for the first door is 1 or not (N1), whether the open demand flag for the first door is 1 or not (N11), whether the close demand flag for the second door is 1 or not (N21) and whether the open demand flag for the second door is 1 or not (N31). In the case where none of these demands is 1, the door open or close control operation in FIG. 26 is not performed.

In the case where the close demand flag for the first door is 1, (Y in N1), it is determined whether the first door is closed or not (N2). In the case where the answer is N, the first door is driven to close (N3) and the buzzer is sounded intermittently (N4).

Once the first door is closed (Y in N2), the close demand flag for the first door is reset (N5) and the lock demand flag is set (N6). As a result, the door is locked in step M2 (FIG. 25) after all the doors are closed.

In the case where the open demand flag for the first door is 1 (Y in N11), it is determined whether the first door is full open or not (N12). In the case where the answer is N, the first door is driven to open (N13) and the buzzer is sounded intermittently (N14).

Once the first door is opened full (Y in N12), on the other hand, the open demand flag for the first door is reset (N15).

In the case where the close demand flag for the second door is 1 (Y in N21) with the second door not closed (N in N22), the second door is driven to close (N23) and the buzzer is sounded (N24). Once the second door is closed (Y in N22), the close demand flag for the second door is reset (N25) and the lock demand flag is set (N26).

In the case where the open demand flag for the second door is 1 (Y in N31), the second door is driven to open (N32) and the buzzer is sounded intermittently (N33). Further, it is determined whether the second door is fully open or not (N34). Once the second door is fully opened by being driven, the open demand flag for the second door is reset (N35).

According to this embodiment, the door open/close demand flag is set without imposing any requirement of the continued operation for 2 seconds in the case where the number of times shifted is 1 or more in steps L5, L25. For safety's sake, however, the continued operation for 2 seconds may be included as a requirement.

(Fifth Embodiment)

With reference to FIGS. 27 to 31, the operation of the door control system according to a fifth embodiment will be explained.

According to this embodiment, the open/close control operation for the power windows is performed in addition to the door lock/unlock control operation and the door open/close control operation.

Figure 27:
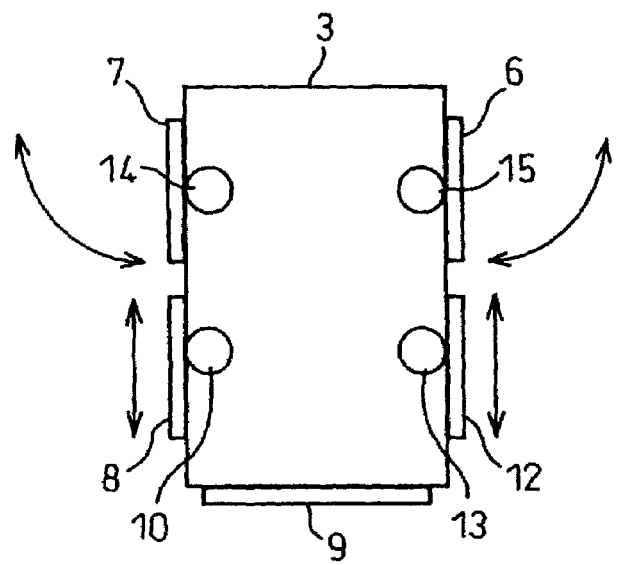
FIG. 27 shows relative positions of the vehicle doors according to a fifth embodiment of the invention.

FIG. 27 shows a vehicle to which this embodiment is applicable. A driver's seat door 6 and a front passenger seat door 7 are provided with power windows 14, 15, respectively. The other points than this are similar to the corresponding points of the fourth embodiment shown in FIG. 18.

Figure 28:
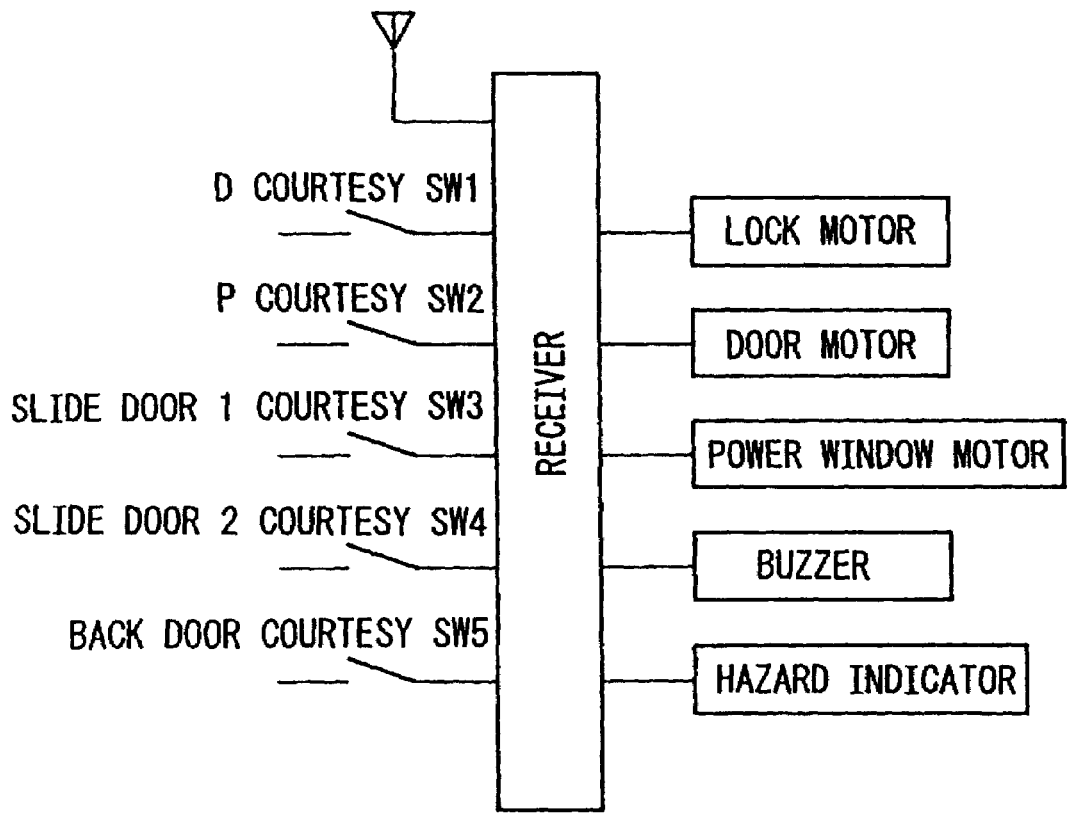
FIG. 28 shows a configuration of a receiver according to the fifth embodiment of the invention.

FIG. 28 shows a configuration of a receiver 2. The receiver 2 outputs a signal to the power window motors 14, 15. Except for this point, the configuration is similar to that of the fourth embodiment shown in FIG. 19.

The configuration of the transmitter is shown in FIG. 19 for the fourth embodiment, and the operation thereof is shown in FIGS. 21 and 22. Thus, the demand signal to be transmitted is the same as that shown in FIG. 20 and contains an ID code, a button code, a time code and a number-of-times code.

Figure 29:
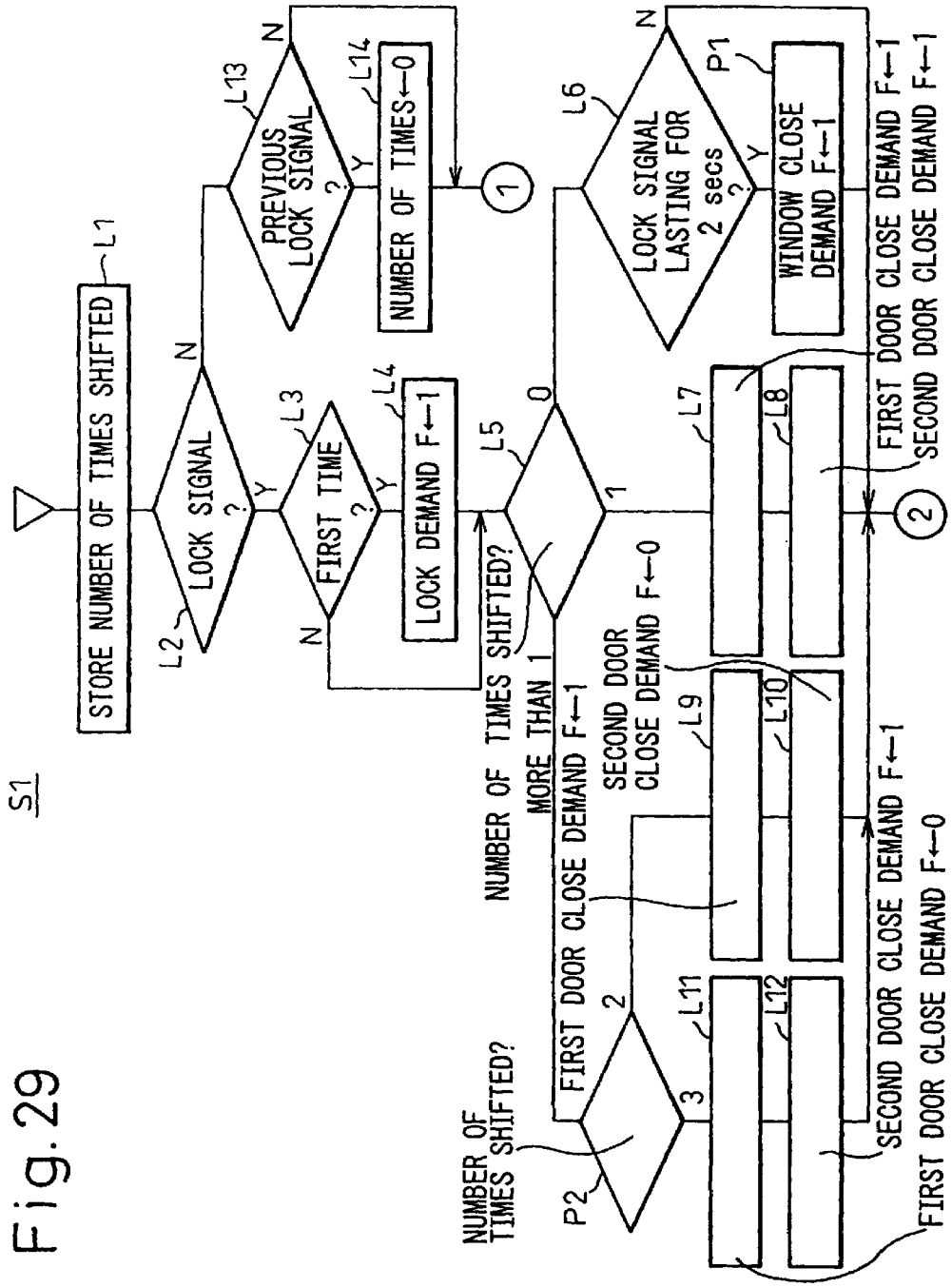
FIG. 29 is a flowchart showing a first flag operation of the receiver shown in FIG. 28.
Figure 30:
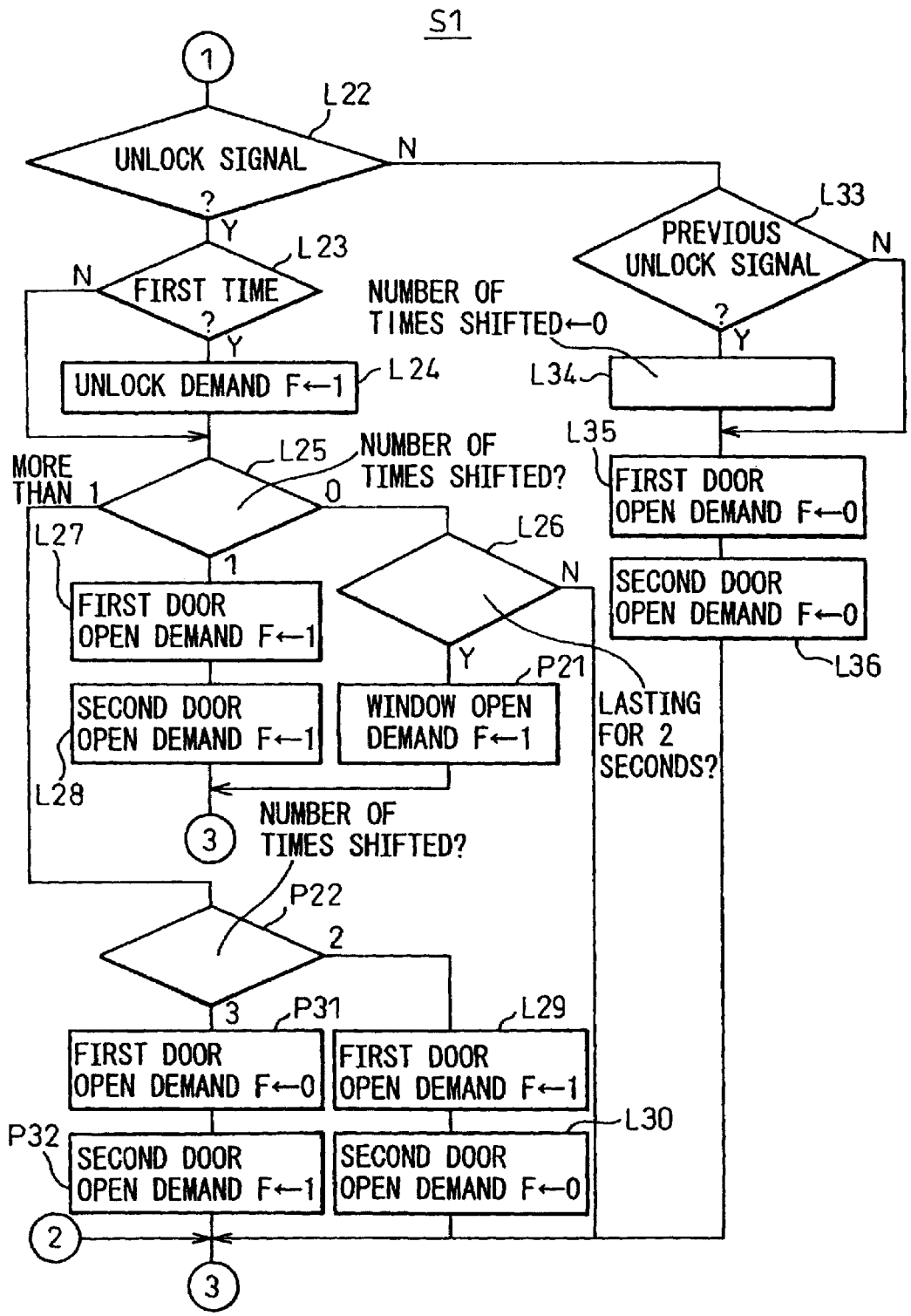
FIG. 30 is a flowchart showing a second flag operation of the receiver shown in FIG. 28.
Figure 31:
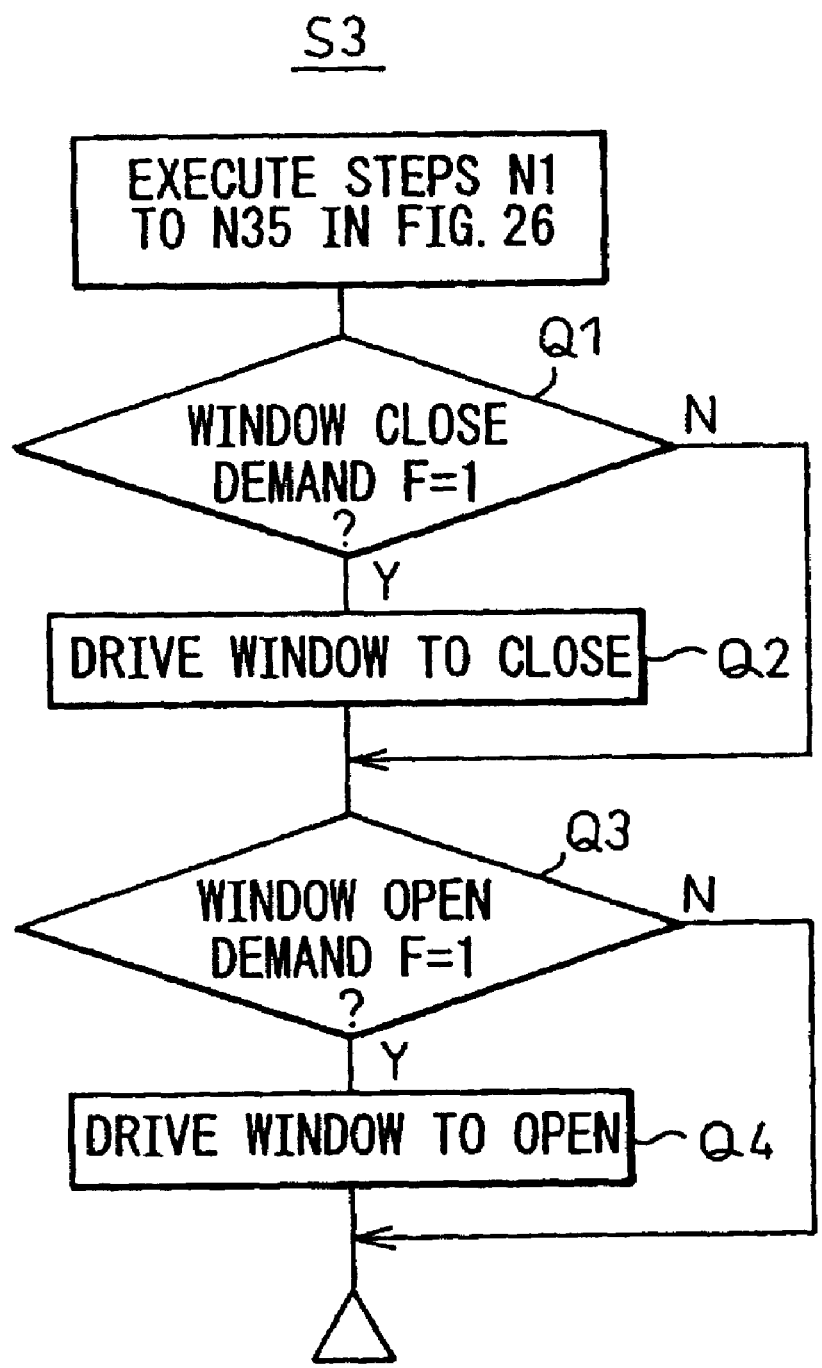
FIG. 31 is a flowchart showing the power window operation of the receiver shown in FIG. 28.

With reference to FIGS. 29 to 31, the operation of the receiver 2 according to this embodiment will be explained. FIGS. 29 to 31 are related to other diagrams as follows:

Step S1 (flag processing operation) in FIG. 5 is associated with FIGS. 29 and 30, step S2 (lock/unlock control operation) in FIG. 5 with FIG. 25, and step S3 (door open/close control operation) in FIG. 5 with FIGS. 26 and 31.

Referring to FIGS. 29 and 30, the flag processing operation will be explained. The flow of operation shown in FIGS. 29 and 30 is a modification of FIGS. 23 and 24. The same steps as those in FIGS. 23 and 24 are designated by the same reference numerals, respectively, and will not be described again.

FIG. 29 shows the process executed in the case where the lock signal is received.

The number of times shifted is determined in the range of 0 to 3 in steps L5, P2. In the case where the number of times shifted is 0 (0 in L5), it is determined whether the lock signal has lasted for 2 seconds or not (L6). In the case where the answer is Y, the (power) window close demand flag is set to 1 (P1).

In the case where the number of times shifted is 1 (1 in L5), on the other hand, the close demand flags for the first and second doors are set (L7, L8). In the case where the number of times shifted is 2 (2 in P2), the close demand flag for the first door is set (19) and the close demand flag for the second door is reset (L10). In the case where the number of times shifted is 3 (3 in P2), the close demand flag for the first door is reset (L11), while the close demand flag for the second door is set (L12).

According to this embodiment, therefore, the power windows are driven to close in the case where the lock button is kept depressed for 2 seconds or longer without depressing the shift button. For opening or closing the slide door, the shift button is depressed once to thrice.

FIG. 30 shows the process executed in the case where the unlock signal is received.

The number of times shifted is determined in the range of 0 to 3 in step L25, P22. In the case where the number of times shifted is 0 (0 in L25), it is determined whether the lock signal has lasted for 2 seconds or not (L26). In the case where the answer is Y, the window open demand flag is set to 1 (P21).

In the case where the number of times shifted is 1 (1 in L25), on the other hand, the open demand flags for the first and second doors are set (L27, L28). In the case where the number of times shifted is 2 (2 in P22), the open demand flag for the first door is set (L29), and the open demand flag for the second door is reset (L30). In the case where the number of times shifted is 3 (3 in P22), the open demand flag for the first door is reset (L31), and the open demand flag for the second door is set (L32).

The process for the lock/unlock control operation is identical to that described with reference to FIG. 25 above.

FIG. 31 shows the open/close control operation for the (power) windows which is performed after the open/close control operation for the slide doors described above with reference to FIG. 26.

As long as the window close demand flag is set to 1 (Y in Q1), the power window is driven to close (Q2), while in the case where the window open demand flag is set to 1 (Y in Q3), the power window is driven to open (Q4).

According to this embodiment, the power window can alternatively be driven either to open or to close only.

Especially, the power window may be driven only to open to avoid the danger of holding an obstacle while being driven to close.

The embodiments of the present invention are described above. The embodiments of the invention, however, are not limited to those described above. For example, the invention is modifiable as follows:

(1) The time code, which is determined by the time length (say, 2 seconds) during which the lock button or the unlock button is depressed, may alternatively be determined by the number of times the lock button or the unlock button is depressed.

(2) In all the embodiments described above, the open/close control operation for the slide doors may be limited to the open control to avoid any danger. On the contrary, the close operation alone can be controlled.

Also, with regard to the transmitter 1, the following functions may be added:

For example, four buttons A, B, C and D are arranged and operated as follows:

(1) Button A is depressed for not longer than 2 seconds to lock the doors and for 2 seconds or longer to close the power windows. Button B is depressed for not longer than 2 seconds to unlock the doors and for 2 seconds or longer to open the power windows. Button C is depressed for 2 seconds or longer to close the doors, and button D is depressed for 2 seconds or longer to open the doors.

(2) Button A is depressed for not longer than 2 seconds to lock the doors and for 2 seconds or longer to close the doors. Button B is depressed for not longer than 2 seconds to unlock the doors and for 2 seconds or longer to open the doors. Button C is used us a panic switch. Within a predetermined time after depressing button A, button D is depressed for 2 seconds to close the power windows. Within an arbitrary time after depressing button B, button D is depressed for 2 seconds to open the power windows. Within an arbitrary time after depressing button D, button B is depressed to release the trunk.

It will thus be understood from the foregoing description that, with the remote door control system according to this invention, both the number of transmitters to be held by the user and the number of the buttons of each transmitter can be reduced while at the same time making it possible to realize a compact transmitter.

Further, according to this invention, a variety of door control operations can be performed in accordance with the mode of operation of the transmitter.

What is claimed is:

1. A door control system comprising:
a transmitter including a button operated to issue a door lock demand signal, a button operated to issue a door unlock demand signal and a transmission circuit for sending out selected one of a lock demand signal and an unlock demand signal in response to the operation of said buttons;
an open/close drive means for driving the doors of an automotive vehicle to open or close;
a lock/unlock control means for controlling the lock/unlock operation of the doors of the vehicle; and
a receiver for receiving a selected one of said lock demand signal and said unlock demand signal from said transmitter and making a determination as to whether said received one of said lock demand signal and said unlock demand signal is in a first mode or a second mode, said receiver outputting a signal for causing said lock/unlock control means to perform a selected one of the lock and unlock operations, respectively, of the doors in the case where said determination shows that said selected one of said lock demand signal and said unlock demand signal is in said first mode, said receiver outputting a signal for causing said door open/close drive means to perform a selected one of the operations for opening and closing the doors, respectively, in the case where said determination shows that said selected one of said lock demand signal and said unlock demand signal is in said second mode.

2. A receiver for a door control system, comprising:
a receiving unit for receiving a lock demand signal;
a determining unit for determining whether said received lock demand signal is in a first mode or a second mode; and
a control unit for outputting a signal for causing a lock control means to lock the doors of an automotive vehicle in the case where said lock demand signal is in said first mode, and outputting a signal for causing a door open/close drive means to perform an operation for closing the doors in the case where said lock demand signal is in said second mode, said control unit thereafter outputting a signal for causing said lock control means to lock the doors.

3. A receiver for a door control system according to claim 2, wherein a selected one of said first mode and said second mode is identified in accordance with a selected one of the lasting time of said received demand signal and the number of times demanded.

4. A receiver for a door control system according to claim 2, wherein said control unit stops the signal for causing said door closing operation in the case where said received demand signal stops.

5. A receiver for a door control system according to claim 2, wherein said control unit fails to stop said signal for causing said door closing operation even in the case where said received demand signal stops.

6. A receiver for a door control system according to claim 5, wherein said control unit forcibly stops said signal for causing said door closing operation in the case where a new signal is received during the output of said signal for causing said door closing operation.

7. A receiver for a door control system according to claim 6, wherein a signal for causing the door opening operation in reverse direction is output to said door open/close drive means in the case where said signal for causing said door closing operation is forcibly stopped.

8. A receiver for a door control system according to claim 2,
wherein said determining unit determines whether a selected one of said received lock demand signal and a received unlock demand signal is in said first mode, said second mode or a third mode, and
wherein said control unit outputs a signal for controlling a first door and a second door in the case where said selected demand signal is in said first mode, outputs a signal for controlling said first door in the case where said selected demand signal is in said second mode, and outputs a signal for controlling said second door in the case where said selected demand signal is in said third mode.

9. A receiver for a door control system according to claim 2, wherein said control unit outputs a signal, for indicating by voice, during the output of a signal for causing a selected one of a door opening operation and said door closing operation.

10. A receiver for a door control system according to claim 2, further comprising a receiving unit for receiving a signal indicating the inclination angle of an automotive vehicle, wherein said control unit stops a signal for causing a selected one of a door opening operation and said door closing operation and outputs an alarm signal in the case where said received inclination angle exceeds a predetermined value.

11. A receiver for a door control system according to claim 2, wherein said determining unit further determines whether a selected one of said received lock demand signal and a received unlock demand signal is in a third mode or not, said determining unit outputting a control signal to the vehicle devices other than said lock control means and said door open/close drive means in the case where said selected one of said received lock demand signal and said received unlock demand signal, as the case may be, is in said third mode.

12. A receiver for a door control system, according to claim 2, wherein:

said receiving unit receives a signal indicating whether the doors are open or closed as detected by a door open/close detection means; and said control unit outputs a signal for causing said door open/close drive means to perform the door closing operation in the case where said door open/close detection means detects that the doors are open upon receipt of said lock demand signal.

13. A receiver for a door control system according to claim 12, wherein said control unit stops the signal for causing said door closing operation in the case where said received demand signal is stopped.

14. A receiver for a door control system according to claim 12, wherein said control unit fails to stop said signal for causing said door closing operation even in the case where said received demand signal is stopped.

15. A receiver for a door control system according to claim 12, wherein said control unit outputs a signal, for indication by voice, during the output of a signal, for causing a selected one of a door opening operation and said door closing operation.

16. A receiver for a door control system according to claim 12, further comprising a receiving unit for receiving a signal indicating the inclination angle of an automotive vehicle, wherein said control unit stops a signal for causing a selected one of a door opening operation and said door closing operation and outputs an alarm signal in the case where said received inclination angle exceeds a predetermined value.

17. A receiver for a door control system, comprising:

a receiving unit for receiving an unlock demand signal;

a determining unit for making a determination as to whether said received unlock demand signal is in a first mode or a second mode; and a control unit for outputting a signal for causing an unlock control means to unlock the doors in the case where said determination shows that said unlock demand signal is in said first mode and outputting a signal for causing a door open/close drive means to perform the door opening operation in the case where said determination shows that said unlock demand signal is in said second mode.

18. A receiver for a door control system according to claim 17, wherein a selected one of said first mode and said second mode is determined in accordance with a selected one of the lasting time of said received demand signal and the number of times demanded.

19. A receiver for a door control system according to claim 17, wherein said control unit stops the signal for causing said door opening operation in the case where said received demand signal stops.

20. A receiver for a door control system according to claim 17, wherein said control unit fails to stop said signal for causing said door opening operation even in the case where said received demand signal stops.

21. A receiver for a door control system according to claim 20, wherein said control unit forcibly stops said signal for causing said door opening operation in the case where a new signal is received during the output of said signal for causing said door opening operation.

22. A receiver for a door control system according to claim 21, wherein a signal for causing the door closing operation in reverse direction is output to said door open/close drive means in the case where said signal for causing said door opening operation is forcibly stopped.

23. A receiver for a door control system according to claim 17, wherein said determining unit further determines whether a selected one of a received lock demand signal and said received unlock demand signal is in a third mode or not, and wherein, in the case where said selected one of said received lock demand signal and said received unlock demand signal, as the case may be, is in said third mode, said determining unit outputs a control signal to the vehicle devices other than said unlock control means and said door open/close drive means.

* * * * *